US007019082B2

(12) United States Patent
Matyjaszewski et al.

(10) Patent No.: US 7,019,082 B2
(45) Date of Patent: Mar. 28, 2006

(54) POLYMERS, SUPERSOFT ELASTOMERS AND METHODS FOR PREPARING THE SAME

(75) Inventors: Krzysztof Matyjaszewski, Pittsburgh, PA (US); Tadeusz Pakula, Mainz (DE)

(73) Assignee: Carnegie Mellon University, Pittsburgh, PA (US)

( * ) Notice: Subject to any disclaimer, the term of this patent is extended or adjusted under 35 U.S.C. 154(b) by 189 days.

(21) Appl. No.: 10/638,584

(22) Filed: Aug. 11, 2003

(65) Prior Publication Data

US 2004/0110893 A1    Jun. 10, 2004

Related U.S. Application Data

(60) Provisional application No. 60/402,279, filed on Aug. 9, 2002.

(51) Int. Cl.
*C08F 4/06* (2006.01)

(52) U.S. Cl. ............ 525/268; 525/301; 525/319; 525/322; 525/324; 526/135; 526/145

(58) Field of Classification Search ............... 526/135, 526/145; 525/301, 268, 319, 322, 324
See application file for complete search history.

(56) References Cited

U.S. PATENT DOCUMENTS

| | | | |
|---|---|---|---|
| 3,183,217 A | 5/1965 | Serniuk et al. | |
| 3,959,225 A | 5/1976 | Kuntz | |
| 4,007,165 A | 2/1977 | MacLeay et al. | |
| 4,374,751 A | 2/1983 | Dudgeon | |
| 4,552,944 A | 11/1985 | Kamiyama et al. | |
| 4,728,706 A | 3/1988 | Farnham et al. | |
| 4,940,648 A | 7/1990 | Geiger | |
| 4,954,416 A | 9/1990 | Wright et al. | |
| 5,089,135 A | 2/1992 | Yoneyama et al. | |
| 5,169,914 A | 12/1992 | Kaszas et al. | |
| 5,210,109 A | 5/1993 | Tateosian et al. | |
| 5,294,678 A * | 3/1994 | Tse et al. ............... | 525/319 |
| 5,312,871 A | 5/1994 | Mardare et al. | |
| 5,331,088 A | 7/1994 | Meister et al. | |
| 5,405,913 A | 4/1995 | Harwood et al. | |
| 5,451,647 A | 9/1995 | Faust et al. | |
| 5,470,928 A | 11/1995 | Harwood et al. | |
| 5,508,353 A * | 4/1996 | Liu et al. ............... | 525/250 |
| 5,510,307 A | 4/1996 | Narayanan et al. | |
| 5,656,708 A | 8/1997 | Meister | |
| 5,763,548 A | 6/1998 | Matyjaszewski et al. | |
| 5,789,487 A * | 8/1998 | Matyjaszewski et al. ... | 525/301 |
| 5,807,937 A * | 9/1998 | Matyjaszewski et al. ... | 526/135 |
| 5,833,320 A | 11/1998 | Ishihara et al. | |
| 5,910,549 A | 6/1999 | Matyjaszewski et al. | |
| 5,945,491 A | 8/1999 | Matyjaszewski et al. | |
| 5,998,537 A * | 12/1999 | Good et al. ............ | 524/588 |
| 6,031,017 A | 2/2000 | Miyanoto et al. | |
| 6,111,022 A | 8/2000 | Matyjaszewski et al. | |
| 6,121,371 A | 9/2000 | Matyjaszewski et al. | |
| 6,124,411 A | 9/2000 | Matyjaszewski et al. | |
| 6,162,882 A | 12/2000 | Matyjaszewski et al. | |
| 6,191,197 B1 | 2/2001 | Toyosawa et al. | |
| 6,288,186 B1 | 9/2001 | Matyjaszewski et al. | |
| 6,407,187 B1 | 6/2002 | Matyjaszewski et al. | |
| 6,512,060 B1 | 1/2003 | Matyjaszewski et al. | |
| 6,538,091 B1 | 3/2003 | Matyjaszewski et al. | |
| 6,624,262 B1 | 9/2003 | Matyjaszewski et al. | |
| 6,624,263 B1 | 9/2003 | Matyjaszewski et al. | |

(Continued)

FOREIGN PATENT DOCUMENTS

EP        0341012        11/1989

(Continued)

OTHER PUBLICATIONS

U.S. Appl. No. 10/269,556 filed Oct. 11, 2002.

(Continued)

*Primary Examiner*—Bernard Lipman
(74) *Attorney, Agent, or Firm*—Kirkpatrick & Lockhart Nicholson Graham LLP

(57) ABSTRACT

Embodiments of the present invention include a material comprising a polymer having a modulus of elasticity less than $10^5$ Pa and a material comprising a polymer having a modulus of elasticity of less than $5 \times 10^4$ Pa. Embodiments also include a material comprising a polymeric network and a multiplicity of side chains attached to the polymeric network. The multiplicity of side chains may have an average molecular weight below the critical molecular weight for entanglements. In certain embodiments it may be advantageous for the side branches to have a glass transition temperature below the use temperature of the material. The polymer network may comprise at least two monomers so that the polymer network is a copolymer. Embodiments of the present invention also include methods of forming a polymer network. Such as, for example, a method of preparing a polymer network comprising cross-linking a polymer, wherein the polymer comprises a multiplicity of side chains. The polymer may be at least one of a polymer brush, a polymer comb, and a nanocomposite material. An additional embodiment may include polymerizing macromonomers in the presence of a crosslinking agent. This embodiment may result in the forming a polymer network, wherein the polymer network comprises a multiplicity of branches attached to the polymer network, wherein the macromonomers may have a molecular weight less than the critical molecular weight for entanglements. Another embodiment of the method of forming a polymer network may comprising polymerizing monomers directly from a crosslinked polymer network. This method may result in forming a branched polymer network, wherein the polymer network comprises a multiplicity of branches attached to the polymer network.

25 Claims, 10 Drawing Sheets

U.S. PATENT DOCUMENTS

| | | |
|---|---|---|
| 6,627,314 B1 | 9/2003 | Matyjaszewski et al. |
| 2002/0026005 A1 | 2/2002 | Munro |
| 2003/0065389 A1* | 4/2003 | Petersen ................ 623/11.11 |

FOREIGN PATENT DOCUMENTS

| | | |
|---|---|---|
| EP | 0530140 | 3/1993 |
| EP | 0870809 | 10/1998 |
| EP | 0879831 | 11/1998 |
| EP | 0879832 | 11/1998 |
| WO | WO 88 00603 | 1/1988 |
| WO | WO 97/20852 | 6/1997 |
| WO | WO 98/01480 | 1/1998 |
| WO | WO 00/56795 | 9/2000 |
| WO | WO 01/71277 | 9/2001 |
| WO | WO 01/77197 | 10/2001 |
| WO | WO 02/28912 | 4/2002 |

OTHER PUBLICATIONS

U.S. Appl. No. 09/359,359 filed Jul. 23, 1999.
U.S. Appl. No. 09/534,827 filed Mar. 23, 2000.
U.S. Appl. No. 09/972,056 filed Oct. 5, 2001.
U.S. Appl. No. 10/034,908 filed Dec. 21, 2001.
U.S. Appl. No. 10/118,519 filed Apr. 6, 2002.
U.S. Appl. No. 10/271,025 filed Oct. 15, 2002.
U.S. Appl. No. 10/289,545 filed Nov. 7, 2002.
Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US,.
Chen et al., "Pryolytic Behavior and In-Situ Paramagnetism of Star-like C60(CH3)x(PAN)xcopolymers", European Polymer Journal, Mar. 1, 1998, pp. 421-429, vol. 34, No. 3-4, Elsevier Science Ltd., Oxford, GB.
Dorota Greszta et al., "Gradient Copolymers of Styrene and Acrylonitrille Via Atom Transfer Radical Polymerization", Polymer Preprints, Apr. 1997, pp. 709-710, vol. 38(1).
Gromada, J.; Matyjaszewski, K. Macromolecules 2001, 34, 7664-7671.
Jin-Shan Wang and Krzysztof Matyjaszewski, "Controlled/ "Living" Radical Polymerization. Atom Transfer Radical Polymerization in the Presence of Transition-Metal Complexes". Reprinted form the Journal of the American Chemical Society, 1995, vol. 117, No. 20.
Jin-Shan Wang and Krzysztof Matyiaszewski, "Controlled/ "Living" Radical Polymerization. Halogen Atom Transfer Radical Polymerization Promoted by a Cu(I)/Cu(II) Redox Process". Reprinted from Macromolecules, 1995, 28. Department of Chemistry, Carnegie Mellon University. Received May 2, 1995; Revised Manuscript Received Aug. 14, 1995.
Krzysztof Matyjaszewski, Mingli Wei, Jianhui Xia and Nancy E. McDermott, "Controlled/"Living" Radical Polymerization of Styrene and Methyl Methacrylate Catalyzed by Iron Complexes 1", Macromolecules, vol. 30, No. 26, 1997.
Krzysztof Matyjaszewski, Simion Coca, Scott G. Gaynor, Mingli Wei and Brian E. Woodworth, "Zerovalent Metals in Controlled/"Living" Radical Polymerization", Macromolecules, 1997, pp. 7348-7350, vol. 30, No. 23.
Matyjaszewski, K.; Editor Controlled/Living Radical Polymerization. Progress In ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.
Matyjaszewski, K.; Xia, J. Chem. Rev. 2001, 101, 2921-2990.
Mingli Wei, Jianhui Xia, Nancy E. McDermott and Krzysztof Matyjaszewski, "Atom Transfer Radical Polymerization of Styrene in the Presence of Iron Complexes", Polymer Preprints, 38(2), 231 (1997), Department of Chemistry, Carnegie Mellon University.
Qiu, J.; Matyjaszewski, K; Thouin, L.; Amatore, C. Macromol. Chem. Phys. 2000, 201, 1625-1631.
Queffelec, J.; Gaynor, S.G.; Matyjaszewski, K. Macromolecules 2000, 33, 8629-8639.
Simion Coca, Christina B. Jasieczek, Kathryn L. Beers and Krzysztof Matyjaszewski, "Polymerization of Acrylates by Atom Transfer Radical Polymerization. Homopolymerization of 2-Hydroxyethyl Acrylate", Journal of Polymer Science, 1998, pp. 1417-1424, vol. 36, Part A: Polymer Chemistry.
Seong Mu Jo et al., "Polyacrylonitrile with Low Polydispersities by Atom Transfer Radical Polymerization", Polymer Preprints, vol. 38(1) Apr. 1997, pp. 697-698.
Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.
Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.
Timothy E. Patten and Krzysztof Matyjaszewski, Atom Transfer Radical Polymerization and the Synthesis of Polymeric Materials, Advanced Materials 1998 10 No. 12, 901-915.
T.E. Patten et al., "Polymers with very Low Polydispersities from Atom Transfer Radical Polymerization", Science, vol. 272, pp. 866-868, May 10, 1996.
U. Schubert et al., "Design of Effective Systems for Controlled Radical Polymerization of Styrene: Application of 4,4'-Dimethyl and 5,5'-Dimethyl 2,2'-Bipyridine Copper (ii) Complexes", Macromol. Rapid Commun., vol. 20, No. 6, pp. 351-355, 1999.
Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.
Wang, J.-S.; Matyjaszewski, K., J. Am. Chem. Soc. 1995, 117, 5614-5615.
Xia J. and Matyjaszewski K., "Controlled/ "Living" Radical Polymerization. Homogenous Reverse Atom Transfer Radical Polymerization Using AIBN as the Initiator," Macromolecules, 1997, pp. 7692-7696, vol. 30.

* cited by examiner

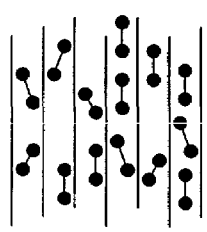
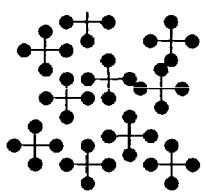
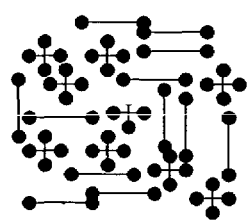
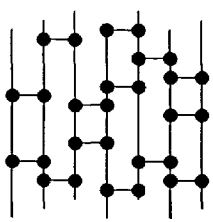
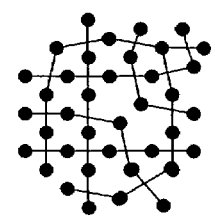
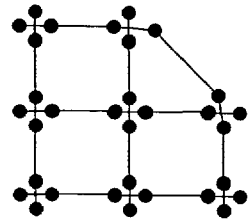
A
B
C
FIGURE 2A
FIGURE 2B
FIGURE 2C

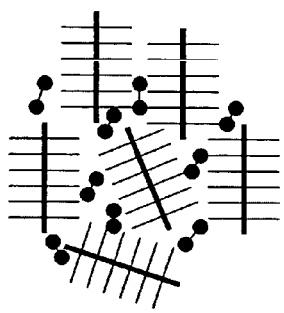
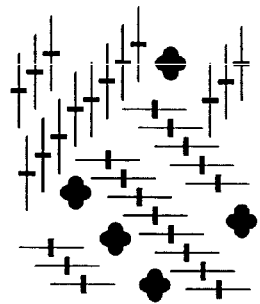
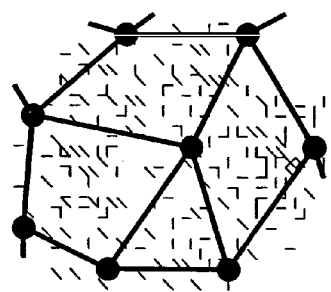
A ⇩   B ⇩   C ⇩
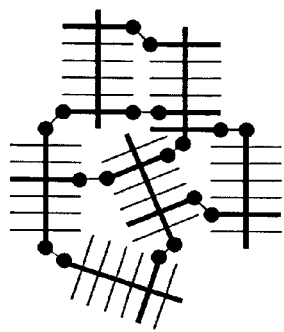
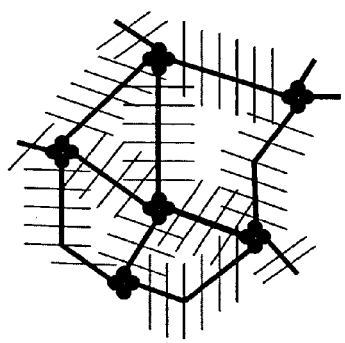
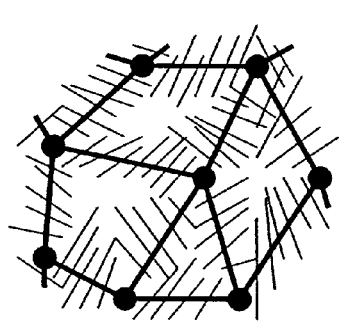
FIGURE 3A    FIGURE 3B    FIGURE 3C

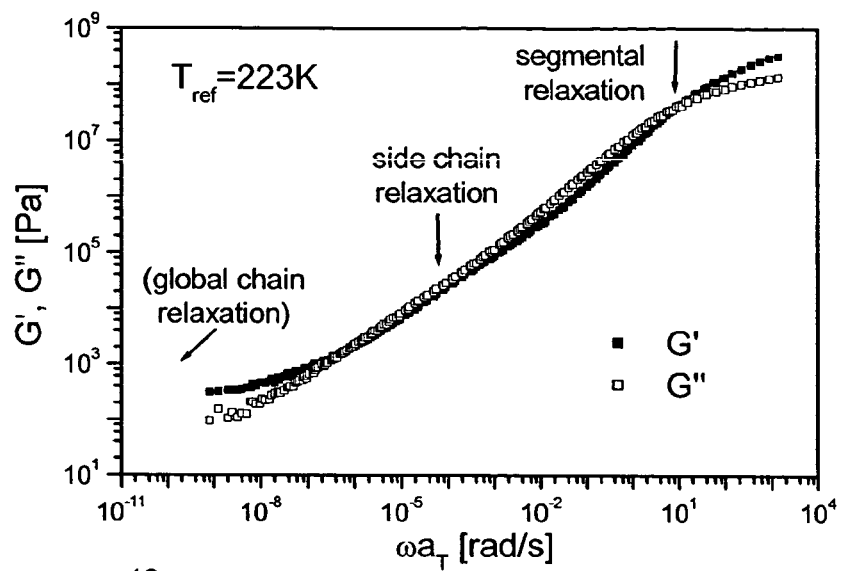
FIG. 8a
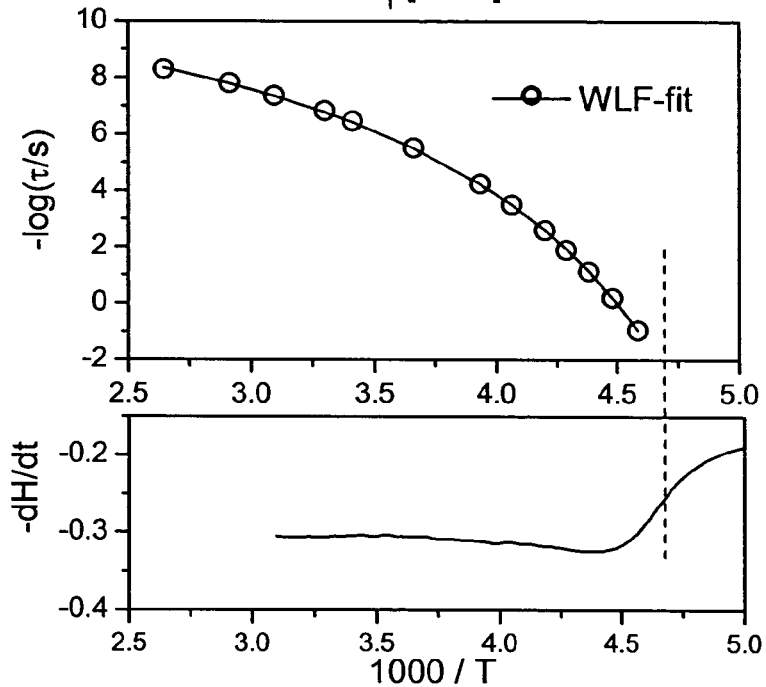
FIG. 8b
FIG. 8c

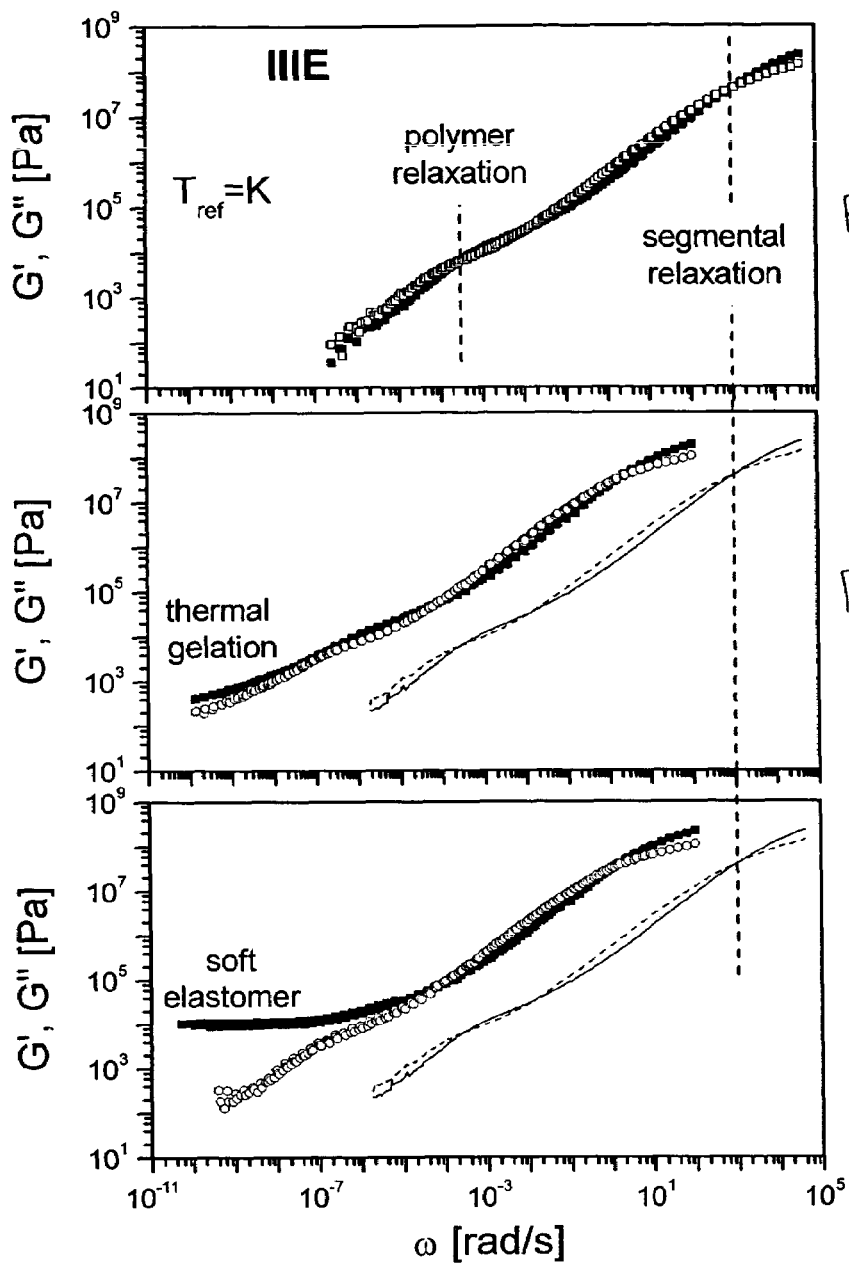

POLYMERS, SUPERSOFT ELASTOMERS AND METHODS FOR PREPARING THE SAME

CROSS REFERENCE TO RELATED APPLICATIONS

This application is a nonprovisional application claiming priority from U.S. application Ser. No. 60/402,279 filed on Aug. 9, 2002.

TECHNICAL FIELD OF THE INVENTION

The present invention relates to a material comprising a polymer network with a multiplicity of branches attached to the network. The material may be super soft, for example, having a modulus of elasticity less than $10^5$ Pa.

BACKGROUND OF INVENTION

The properties of polymers can vary over a wide range and are a consequence of the structure of the polymer and the interactions of the individual polymer building blocks and a broad range of macromolecular parameters. The particular state of a distinct polymeric material at any instance depends on the temperature and deformation rate of the material, as well as other factors. The properties of a specific linear polymer vary from a solid (glassy or crystalline) state at lower temperatures to a liquid-like state at high temperatures. The modulus may vary from higher than $10^9$ Pa for the glassy state to lower than $10^4$ Pa for the melt state. By increasing the deformation rate at a constant temperature, the properties can change within the same range but in the opposite direction i.e. from liquid-like to the solid-like behavior at low and high deformation rates, respectively.

An intermediate rubbery state, where rubber-elastic properties are developed, is very specific to polymers. In amorphous polymers, the elastic properties result from entanglement of polymer chains, if the chains are sufficiently long. This rubbery state may be observed in either the modulus vs. temperature, or in the modulus vs. deformation rate curves, as a rubbery plateau. The rubbery state does not appear for a polymer having a molecular weight below the critical molecular weight for entanglements ($M_e$). The length of the plateau is very much dependent on the length of the molecular chains or the molecular mass of the polymer. The height of the plateau is only weakly dependent on the type of the polymer and typically assumes a value in the range between $10^5$ and $10^6$ Pa. Typical experimental values for the shear modulus of this rubbery plateau for some commodity polymers are given in Table 1. It is believed that the modulus of the rubbery plateau is proportional to the number of entanglements, as illustrated in Table I, it decreases with increasing molecular weight between entanglements ($M_c$).

TABLE 1

Values of the rubbery shear modulus of some polymers (from D. W. van Krevelen, Properties of Polymers, Elsevier, Amsterdam 1997)

| Polymer | Molecular Weight between entanglements $10^3$ g/mol | Tg [K] | $G_r$ $10^5$ Pa |
| --- | --- | --- | --- |
| Polypropylene (am) | 7 | 258 | 5 |
| Poly(vinyl chloride) | 6.2 | 356 | 4 |
| Polyisobutylene | 16 | 198 | 3 |
| Poly(n-butyl acetate) | 28 | 226 | 1.5 |
| Poly(vinyl acetate) | 25 | 301 | 1.3 |
| Polystyrene | 35 | 375 | 1.3 |

The typical mechanical behavior of an amorphous polymer under small dynamic deformation is illustrated in FIG. 1 showing dependencies of components (real G' and imaginary G") of the complex shear modulus, G, on temperature (FIG. 1a) and deformation frequency (FIG. 1b). The transitions between the different states, glass, rubber and melt, may be influenced by the molecular dynamics. The material transforms from a glass to a rubber due to the local segmental mobility of polymer chains. It remains in the rubbery state as long as the deformation period is shorter than the time necessary to disentangle a polymer chain from an entangled network of other chains. The time necessary to disentangle a polymer chain corresponds to the rotational relaxation times of linear polymer chains in the melt [T. Pakula, S Geyier, T Ediing and D. Boese, Rheologica Acta 35, 631(1996)]. At deformation rates that are slow in comparison with the relaxation time, the system flows and enters the melt state.

The rubbery state can, however, be fixed by chemical or physical cross-linking of the polymer chains. The characteristic rubbery properties, then, remain over a very broad range of variation of the temperature and of deformation rate. This behavior results in the formation of a plateau in the shear modulus curves, shown schematically by means of dashed horizontal lines in FIGS. 1a and 1b.

Crosslinking a polymer results in the formation of a polymer network. There are several ways to obtain a polymer network. Some of them are illustrated two-dimensionally in FIG. 2. Cross-linked polymers (elastomers) of both natural and synthetic origin constitute the oldest class of commercial polymeric materials (rubbers) and are still one of the basic industrial products. Physical characteristics of an elastomer are a low modulus and the capacity for high deformability, when compared with hard solids (e.g. glass or metal). Elastomers have a typical Young's modulus value (at small strains) of the order of $10^6$ Pa, with reversible extensibility reaching 1000%.

The main characteristic property, the shear elastic modulus, G, at small deformations for such rubbery materials, is determined by Equation (1) derived on the basis of fundamental thermodynamic considerations, assuming that the work of deformation corresponds to variation of entropy related to extension of Gaussian chains, $$G = \rho RT/M_c \qquad (1)$$

where $\rho$ is the density of the rubber, R is the gas constant per mole and $M_c$ is the number average molecular weight between cross-links [L. R. G. Treloar in "The Physics of Rubber Elasticity" Clarendon Press, Oxford 1975].

As this relationship indicates the properties of these materials can be modified by variation of cross-link density. Weakly cross-linked rubbers preserve the modulus of the rubbery plateau seen for the melt of linear entangled polymers ($M_c$ remains similar to the order of $M_e$) is higher. The shear elastic modulus may be increased by increasing the cross-link density or as a result of physical cross-linking, such as, crystallization or by microphase separation in block copolymers comprising incompatible segments (thermoplastic elastomers). [Thermoplastic Elastomers, A Comprehensive Review Edited by Legge, N. R.; Holden, G.; and Schroeder H. E. Hanser Publication 1987].

However, it is not easy to reduce the shear elastic modulus below the bulk plateau modulus of a given polymer, but the plateau modulus may be lowered considerably in polymer solutions, [P. -G. de Gennes in "Scaling Concepts in Polymer Physics", Cornell University, Ithaca 1979; T. Inoue, Y. Yamashita, K. Osaki, Macomolecules 35, 1770, 2002] and soft gels may be obtained by swelling weakly cross-linked systems with a solvent. However, solvent swollen polymers gels are not stable in environments in which the solvent can evaporate or in some instances when external forces are exerted on the gel. In networks of strongly hydrophilic polymers (e.g. hydrogels), shear elastic moduli in the order of $10^3$ Pa can be obtained at low cross-link densities and relatively high degrees of swelling. Higher levels of swelling may result in an increase in shear elastic modulus, because of strong extension of the network chains. [e.g. U. P. Schröder and W. Oppermann, in "Physical properties of polymer gels" Ed.: J. P. Cohen Addad, John Wiley & Sons, Chichester 1996].

Therefore, there is a need for softer materials that do not comprise a solvent. There also exists a need for a bulk polymer network with a Young's modulus less them $10^5$ Pa.

SUMMARY

Embodiments of the present invention include a material comprising a polymer having a modulus of elasticity less than $10^5$ Pa and a material comprising a polymer having a modulus of elasticity of less than $5 \times 10^4$ Pa.

Embodiments also include a material comprising a polymeric network and a multiplicity of side chains attached to the polymeric network. The multiplicity of side chains may have an average molecular weight below the critical molecular weight for entanglements. In certain embodiments it may be advantageous for the side branches to have a glass transition temperature below the use temperature of the material. The polymer network may comprise at least two monomers so that the polymer network is a copolymer.

Embodiments of the present invention also include methods of forming a polymer network. Such as, for example, a method of preparing a polymer network comprising cross-linking a polymer, wherein the polymer comprises a multiplicity of side chains. The polymer may be at least one of a polymer brush, a polymer comb, and a nanocomposite material. An additional embodiment may include polymerizing macromonomers in the presence of a crosslinking agent. This embodiment may result in the forming a polymer network, wherein the polymer network comprises a multiplicity of branches attached to the polymer network, wherein the macromonomers may have a molecular weight less than the critical molecular weight for entanglements. Another embodiment of the method of forming a polymer network may comprising polymerizing monomers directly from a crosslinked polymer network. This method may result in forming a branched polymer network, wherein the polymer network comprises a multiplicity of branches attached to the polymer network.

BRIEF DESCRIPTION OF FIGURES

FIG. 2 include schematic examples of various ways polymer networks may be formed, such as, FIG. 2A, cross-linking of linear polymers (vulcanization), FIG. 2B, polymerizing multifunctional monomers, wherein f>2) and FIG. 3C, linking of polymer ends by means of a cross-linking agent;

FIG. 3 includes schematic examples of various possibilities super-soft elastomeric networks may be formed; FIG. 3A, cross-linking of prepolymerized brush-like macromolecules, FIG. 3B, polycondensation of macromonomers in the presence of a crosslinking agent, note however when functionality is at one chain end, addition polymerization may be a preferred route to prepare polymacromers, and FIG. 3C, using a network swollen by a monomer as a macroinitiator for the grafting from polymerization;

FIG. 8 includes graphs of the (FIG. 8a) frequency dependencies of the real (G') and imaginary (G") shear modulus components for a polymer obtained by "grafting through" method, cross-linked at high conversion stages of the polymerization, (FIG. 8b) temperature dependence of the segmental relaxation time and the fit of the WLF relation, and (FIG. 8c) DSC thermogram for the same sample;

FIG. 9 is a graph of the frequency dependencies of the real (G') and imaginary (G") shear modulus components for: (a) non cross-linked polymer example 6b IIIE obtained by "grafting from" method, (b) the same polymer annealed at 100° C. and (c) the polymer annealed at 120° C. The annealing has been performed in vacuum for 4 hours.

DETAILED DESCRIPTION OF INVENTION

Figure 1A:
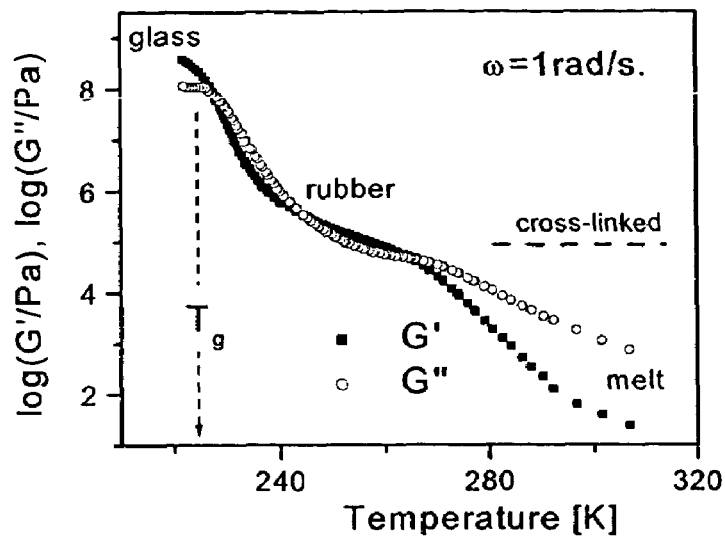
FIG. 1 includes graphs of the temperature (FIG. 1a) and frequency (FIG. 1b) dependencies of the storage (G') and loss (G") shear moduli for a melt of linear PnBA with $M_n$=61500; the glassy, rubbery and melt flow ranges are indicated and the dashed horizontal lines indicate the level of the rubbery plateau attained if the system is cross-linked.
Figure 1B:
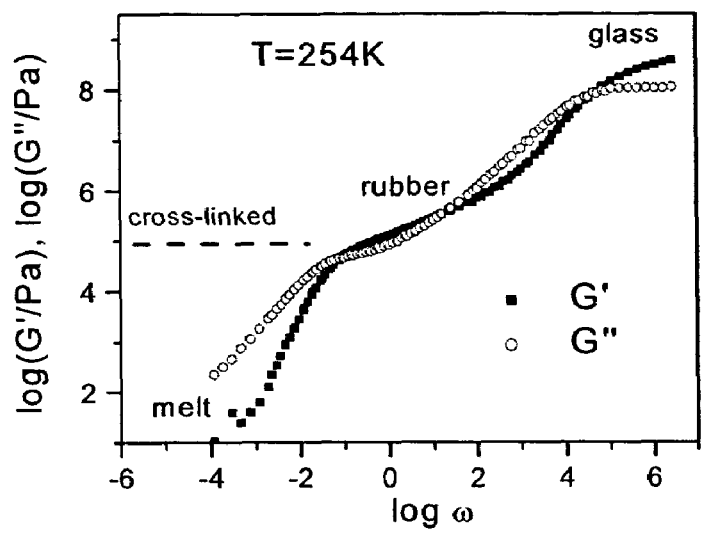

The present invention relates to materials comprising a polymer network and a multiplicity of side chains attached to the polymer network. Embodiments of the material may be stable super-soft rubbers. The super-soft rubbers may be comparable to solvent swollen polymer gels except the "solvent" is attached to the polymer network. At a superficial phenomenological level, the material acts as if it comprises a polymer network of thick molecules. In certain embodiments, the attached branches have a molecular weight which is less then the critical molecular weight for entanglements of a free polymer of the same composition.

In certain embodiments, the side chains act similarly to a swelling agent covalently attached to the polymer network. In this embodiment, the swelling agent constitutes dangling side chains that are short enough to reduce entanglements such that the side chains do not significantly contribute to an increase in the modulus. Therefore, embodiments of the present invention comprise super-soft elastomers comprising a polymer network with a multiplicity of side chains, a significant portion of the side chains having a molecular weight below the critical molecular weight for entanglements ($M_e$). For example, the dominant fraction of the side chains, greater than 50%, have a molecular weight less than $M_e$. In other embodiments, the Tg of the side chains or "hairs" may be less than the use temperature of the material but can be above or below room temperature depending on application: e.g., a super-soft elastomer for a sealing application in an engine could have the Tg of the "hair" above room temperature. In other embodiments, the $T_g$ of the side chains may be less than 0° C. or less than −20° C. where softer properties are required at lower temperatures.

In certain super soft elastomer embodiments of the invention, the side chains of the polymer network may act to swell the polymer network. Any length of side chain and degree of polymerization of the side chains capable of swelling the polymer sufficiently to provide the desired characteristics may be incorporated into the polymer network. The DP or molecular weight of the side chains and the DP of the polymer network backbone between the side chains may be interrelated to provide the desired properties. Such that in certain embodiments, the DP or molecular weight of the side chains may be reduced and the DP of the polymer network backbone between side chains may be increase to produce a polymer network with similar characteristics. The side chains, in super soft elastomer applications, may be of a sufficient volume fraction of the entire material to swell the polymer network. For example, for a polymer network that is lightly crosslinked the average DP of the backbone polymer of the network between crosslinks may be greater than 200 for embodiments of the invention, the average DP of the backbone polymer of the network between crosslinks may be increased to greater than 1000, or in certain applications greater than 5000. For highly cross linked polymer networks, the average DP of the backbone polymer of the network between crosslinks may be less than or equal to 200 for embodiments of the invention, the average DP between crosslinks may be reduced to less than 30 in certain applications.

The number of side chains on the backbone of the polymer network between the crosslinks may also be modified to control the properties of the material. A multiplicity of side chains attached to the polymer network may be any number sufficient to swell the polymer network. Such as, for example, the average number of side chains between crosslinks on the backbone of the polymer network may be greater than 5. In other embodiments, wherein a higher average number of side chains between cross-link is desired the average number of side chains between crosslinks on the backbone of the polymer network may be greater than 50, or greater than 75 or even greater than 100.

The polymer network and branches may independently comprise any polymerizable monomer. In certain embodiments, monomers capable of being polymerized by a controlled polymerization process may be preferred. In one embodiment of the method of the present invention, at least a portion of the monomers may be macromonomers for direct incorporation of a branch, or hair, into the polymer backbone or comprise functionality capable of reacting with monomers or a macromonomer to form a side chain, or capable of modification to include such branching functionality.

Examples of monomers may include but are not limited to alkyl acrylates, butyl acrylates, methyl acrylates, ethyl acrylates, methacrylates, styrenes, acrylamides, acrylonitrile, (meth)acrylamides, vinyl pyridine, isobutene, ethylene oxide, alkyl methacrylates, lactides, dimethyl siloxane, poly (ethylene oxide)s, poly (ethylene oxide) methyl ether methacrylate, hexyl ethyl methacrylate, 2-(bromopropionic acid) ethoxy methacrylate, 2-(trimethy silyloxy) ethyl methacrylate, as well as other monomers. However, any polymerizable monomers may be used for the preparation of backbones and hairs, such as, omoners which may be polymerized by radical, anionic, cationic, coordination or ring opening polymerization processes.

The network is usually considered to be on macroscopic molecule but may include more than one polymer network physically connected. Examples of the formation of networks are shown in FIG. 2.

Recent advances in synthetic polymer chemistry allow preparation polymer brushes, combs, or nano composite materials with a multiplicity of attached polymer chains, which may be considered examples of "hairy" macromolecules. Hairy macromolecules may be prepared by 'grafting from' a multifunctional macroinitiator, by 'grafting to' a linear backbone or by 'grafting through' using macromonomers. Both 'grafting from' and 'grafting through' will be exemplified herein but 'grafting to' as shown in FIG. 3C is also a viable route to super-soft elastomers. The preparation of "hairy" nanoparticles can also be conducted by 'grafting from' initiator sites attached to a particle forming a particle with a multiplicity of attached arms.

One embodiment of the method of forming polymer and nanoparticle networks has been discussed in U.S. Pat. Nos. 5,807,937; 5,789,487, 5,910,549; 5,763,548; 5,789,489, 6,111,022; 6,124,411; 6,162,882; 6,407,187; 6,512,060; 6,538,091 and 6,541,580 and U.S. patent application Ser. Nos. 09/534,827; 09/972,046 and 10/034,908, the entire contents of which are incorporated herein by reference. Other controlled radical polymerization (CRP) processes may additionally be used for the preparation of "hairy" macromolecules and nanoparticles, such as, stable-free radical polymerization (SFRP), represented by nitroxide mediated polymerization (NMP), and reversible addition fragmentation chain transfer (RAFT) have been discussed in three ACS Symposium series edited by Matyjaszewski. [ACS Symposium Series Nos. 685, 768 and 854]. However, any controlled polymerization process may be used to prepare a linear, branched, star, dendritic or nanocomposite "hairy" macromolecule for forming into the polymer network. (See FIG. 3A). Developments have occurred in radical, anionic, cationic, ring opening polymerization, as well as other controlled living or "living" polymer synthesis routes that allow control of the uniformity and shape of the macromolecules including synthesis of "hairy" macromolecules.

In certain embodiments, the "hairy" macromolecules are cross-linked to form a polymeric network. The hairy macromolecules may be a block copolymer in which not all of the blocks comprise side branches. Embodiments of the present invention would also include cross-linking hairy macromolecules with polymers of other topologies, including linear, triaem, tetra-arm, and dendritic molecules, as well as other topologies. The "hairy" macromolecule may include cross-linking functionality at any point in the polymer structure. (FIG. 3A) The functionality may form a network by heat, light, or other stimulant or may form a network by reaction with an added agent, such as a catalyst or chemical agent or may form a network by physical processes such as microphase separation, crystallization, or partial tethering to a substrate. The network may be formed by any process known to prepare networks. Other embodiments, such as, but not limited to the embodiments shown in FIG. 3C, may include forming the hairs by "grafting to" or "grafting from" a polymeric network.

Figure 4:
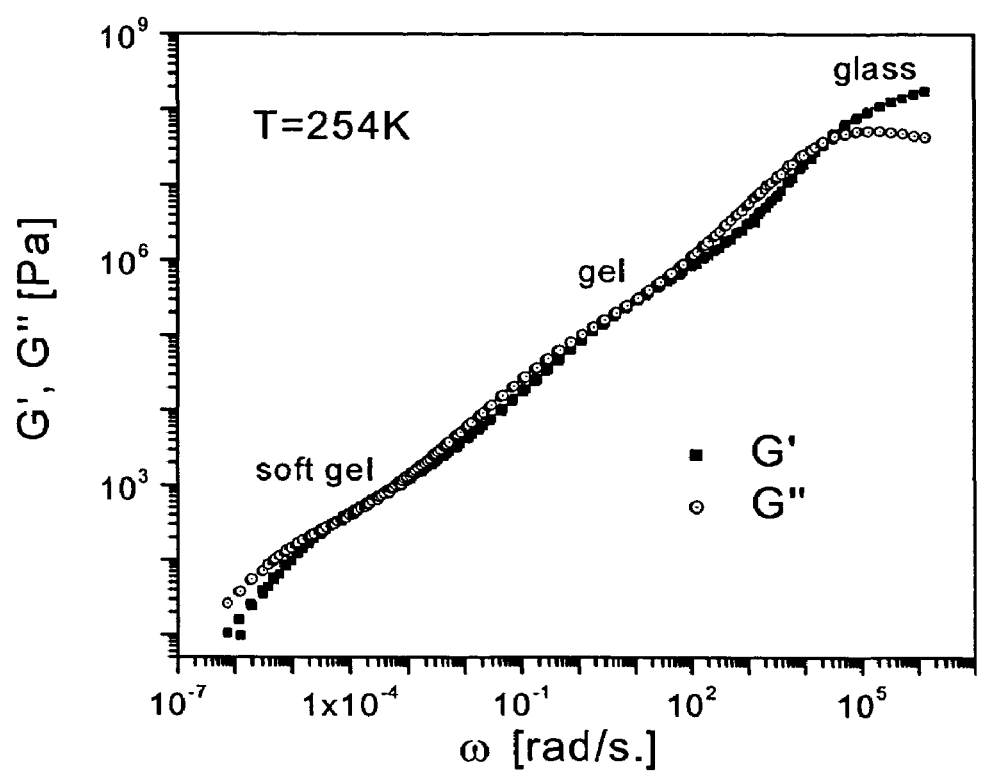
FIG. 4 is a graph of the frequency dependencies of the real and imaginary parts of the complex modulus obtained from a melt of PnBA molecular brushes with $N_b$=3500 monomer units and $N_{sc}$=30; three regions may be distinguished which correspond to various material states: (1) glassy, (2) hard gel and (3) soft gel; cross-linking may be utilized to transform the soft gel to a soft rubber (see FIG. 5)

The mechanical properties of melts of "hairy" macromolecules are now being studied. [Pakula, T.; Minkin, P.; Beers, K. L.; Matyjaszewski, K. *Polymeric Materials Science and Engineering* 2001, 84, 1006–1007] Molecular brushes and other branched polymers have much more complex relaxation spectrum than linear polymers. The modulus curves for macromolecules with non-linear topologies may include a plateau with a considerably lower modulus in condensed, or bulk, systems consisting of amorphous highly branched macromolecules, such as molecular brushes with a large number of side chains densely grafted to the backbone. An illustration of the bulk properties of such a polymer is shown in FIG. 4. The side chains on the backbone polymer, or on a graft attached to the backbone polymer, act to form a soft flexible coating around the polymer backbone while still allowing long-range mobility of the backbone. In certain cases, the branched polymer may be considered as an extremely thick polymer. [See images in Qin, S.; Borner, H. G.; Matyjaszewski, K.; Sheiko, S. S. *Polymer Preprints (American Chemical Society, Division of Polymer Chemistry)* 2002, 43, 237–238.] Such a polymer has a new slow relaxation process due to very high $M_e$, with ultra low values of elastic modulus. The inflection in the modulus, or modulus plateau observed in melts of molecular brushes (see example 1) with a very long backbone polymer, ($N_b$>3,000) and short poly(n-butyl acrylate) (PnBA) branches ($N_{sc}$~30) attached to the backbone polymer at substantially every second carbon unit, is in the range between $10^2$ and $10^3$ Pa. The modulus also depends on the length of the branches, the bulkiness of the branches, rigidity of the branches, and the density of grafting, as well as other functions. All of these aspects of the polymer structure can be independently modified as disclosed herein and in referenced patents and articles.

We have now surprisingly determined that this slow relaxation process with ultra low values for the modulus observed for a polymer brush may be fixed by cross-linking to form a polymer network with low values for the modulus. A material of the present invention comprising the polymer network and a multiplicity of side chains may have a super-soft rubbery state or be a stable super-soft elastomer. (See FIG. 5). Further, the modulus plateau of embodiments of the invention extends over a very broad temperature range (tested from room temperature up to 180° C.) when detected isochronously. Embodiments of the material disclosed herein behave as elastomers, have very good reversibility and a small hysteresis under tensile deformation (FIG. 6). After quasi static extensions for up to 100% ($\epsilon$=1) the residual strain remains below 1%.

Embodiments of the present invention include a new sub-class of bulk materials: super-soft elastomers. These novel elastomeric materials preserve a reasonably high degree of reversible deformability but embodiments of the super-soft elastomers may be orders of magnitude softer than existing bulk rubbers. They will find application where tactile properties and low pressure conformational sealing are desired. Further applications will result from consideration of the manner in which pressure fronts, such as sound waves or physical impact, are absorbed or modified by the super-soft surfaces. Embodiments of the material of the present invention may have a modulus of less than $10^5$ Pa or less than $5\times10^4$ Pa, for certain applications the modulus may be between $10^2$ Pa and $10^5$ Pa. The or more preferably between $10^2$ Pa and $5\times10^4$ Pa or most preferably between $10^2$ Pa and $10^4$ Pa for applications were supersoft of materials would offer a benefit.

Figure 7:
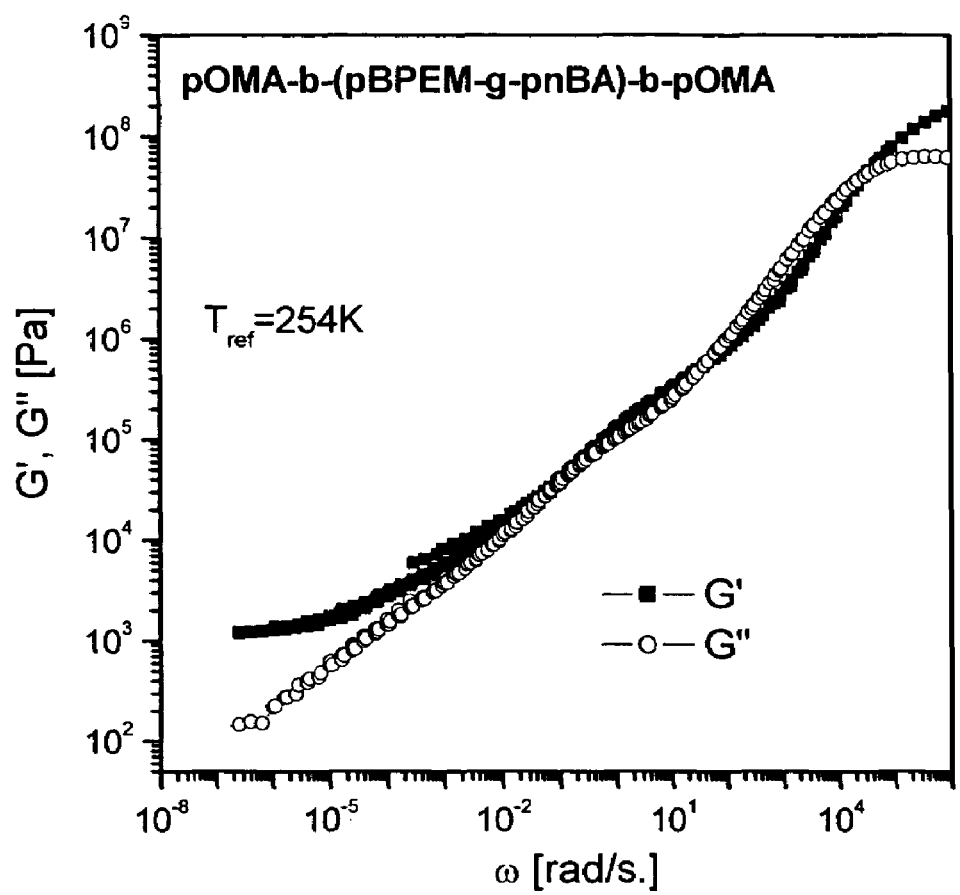
FIG. 7 is a graph of the frequency dependencies of the storage (G') and loss (G") modulus for the triblock copolymer with a brush-like middle block (master curves at the reference temperature of 254K); a discontinuity seen in G' corresponds to melting in the pOMA microphase taking place at 292K.

Embodiments include environmentally stable, bulk super-soft elastomers can be formed when "hairy" macromolecules, or "hairy" nanoparticles, with appropriately selected chain lengths, i.e. lower than $M_e$, and selected composition, are crosslinked. These "hairy" macromolecules may appear as individual "thick" molecules in AFM microphotographs on a mica surface. Herein, we also describe the preparation of "hairy" macromolecules of several different topologies including linear, [Qin, S.; Borner, H. G.; Matyjaszewski, K.; Sheiko, S. S. *Polymer Preprints (American Chemical Society, Division of Polymer Chemistry)* 2002, 43, 237–238.] tri-arm or tetra-arm star, [Matyjaszewski, K.; Qin, S.; Boyce, J. R.; Shirvanyants, D.; Sheiko, S. S. *Macromolecules* 2003, 36, 1843–1849] and block copolymers [Qin, S.; Matyjaszewski, K.; Xu, H.; Sheiko, S. S. *Macromolecules* 2003, 36, 605–612.] wherein one or more polymer segments comprise "hairy" macromolecular segments and at least one segment is not a macromolecular segment. The composition of such block copolymers wherein one or more polymer segments are "hairy" segments are selected so that the bulk material may undergo physical phase separation. In certain embodiments it is defined since physical cross-linking can also induce the formation of super-soft elastomeric properties. (FIG. 7)

The creation of a new inflection or plateau in the modulus curves has also been observed for other systems, such as melts of multiarm stars or dispersions of hairy nanospheres in polymer matrices; materials in which a large number of dangling chains are present. [T. Pakula, D. Vlassopoulos, G. Fytas and J. Roovers Macromolecules 31,8931(1998); K. Gohr, T. Pakula, K. Tsutsumi, W. Schärt Macromolecules 32, 7156(1999); G. Lindenblatt, W. Schärtl, T. Pakula, M. Schmidt Macromolecules 34(6):1730–1736, 2001] We now believe that the inflection in the modulus curves observed for melts of multiarm stars or dispersions of hairy spheres in polymer matrices, and indeed any systems in which a large number of dangling chains are present, may be stabilized by a method of the present invention comprising chemical or physical cross-linking of such polymers to create bulk stable super-soft elastomers with networks comprising different intramolecular topology.

Embodiments of the present invention include materials comprising a polymer network diluted by a multiplicity of attached side chains. Since the diluent is covalently attached to the polymer network, the intramolecular topology of the material provides stability against evaporation, leaching, deformation, and extrusion induced by any form of mechanical or thermal stress, etc. of the "diluent". The material thereby remains highly homogeneous in many environments and a collapse of the network, as seen in the case of elastomers swollen by an unattached solvent, (e.g. hydrogels) may not as easily occur.

Embodiments of the present invention include methods of preparing polymer networks, (see FIG. 3), such as:

1. Cross-linking polymers, wherein the polymers include multiplicity of side chains, such as, but not limited to, hyperbranched, dendritic, multiarm stars, hairy nanoparticles, brush polymers and comb products. Embodiments may include doping the macromolecules with cross-linking agents or using macromolecules with incorporated functional groups capable of causing cross-linking to inherently allow formation of networks (FIG. 3A). In certain embodiments, a substantial portion of the side chains have a molecular weight less than the $M_e$.

2. Polymerizing macromonomers, by any suitable polymerization process including addition and condensation polymerization processes, in the presence of a crosslinking agent. Branching and or network formation is conducted to form a polymer network. See FIG. 3B that shows a condensation process that could be applied to the linking of ABA block copolymers, other embodiments include an addition polymerization process of macromonomers with telechelic functionality and an added cross-linking agent. Addition polymerization allows preparation of high molecular weight polymacromers and indeed in the examples section examples are provided of polymerization of macromonomers of differing phylicity by this method.

3. Polymerizing monomers from the backbone of a cross-linked polymer network. The monomers may swell the network and a grafting from or grafting to polymerization may be conducted to add side chains to the polymer network. (See FIG. 3C).

4. Forming a microphase separated mixture of di- and triblock copolymers with constituents, composition and molecular weights, designed to enable the glassy component to form phase separated cores of spherical domains which remain separated in space by the soft hairy anchored parts but which are also bound into a global network via the long soft internal fragments of the triblock copolymer forming bridges between different glassy domains. The dispersed phase separated block may also be selected to dissolve in a substrate thereby allowing formation of a coated substrate wherein the coating is an attached super-soft elastomer. Such an approach would modify the tactile properties of the substrate which may be a solid, a film or a fiber.

These methods, may be utilized to form a super-soft rubber state resulting from formation of a stable, "swollen", polymer network wherein the "swelling agent" is a side chain attached to the network.

Figure 5A:
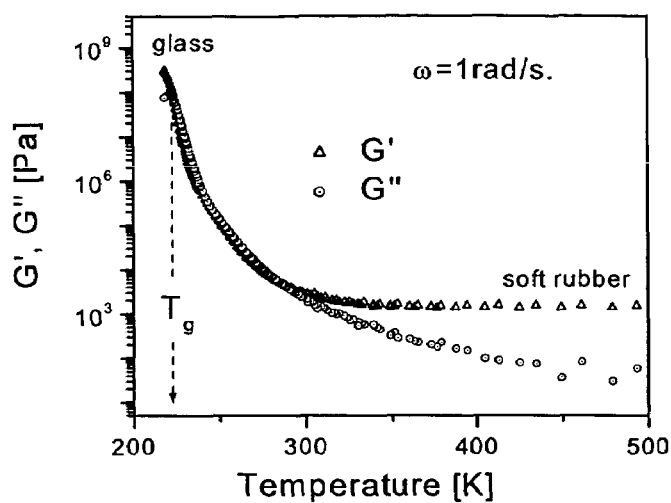
FIG. 5 includes graphs of the temperature (FIG. 5a), and frequency (FIG. 5b) dependencies of the storage (G') and loss (G") shear moduli for a weakly cross-linked PnBA brush molecule system with $N_b$=3500 and $N_{rc}$=30. Glassy, gel and the super-soft rubber ranges can easily be distinguished.
Figure 5B:
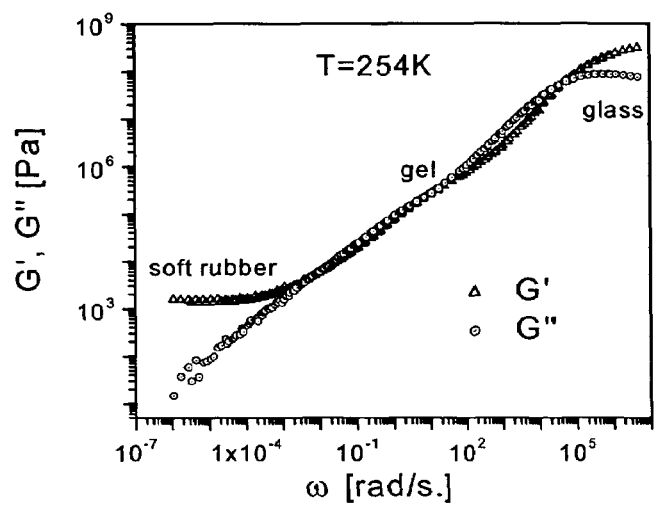
Figure 6:
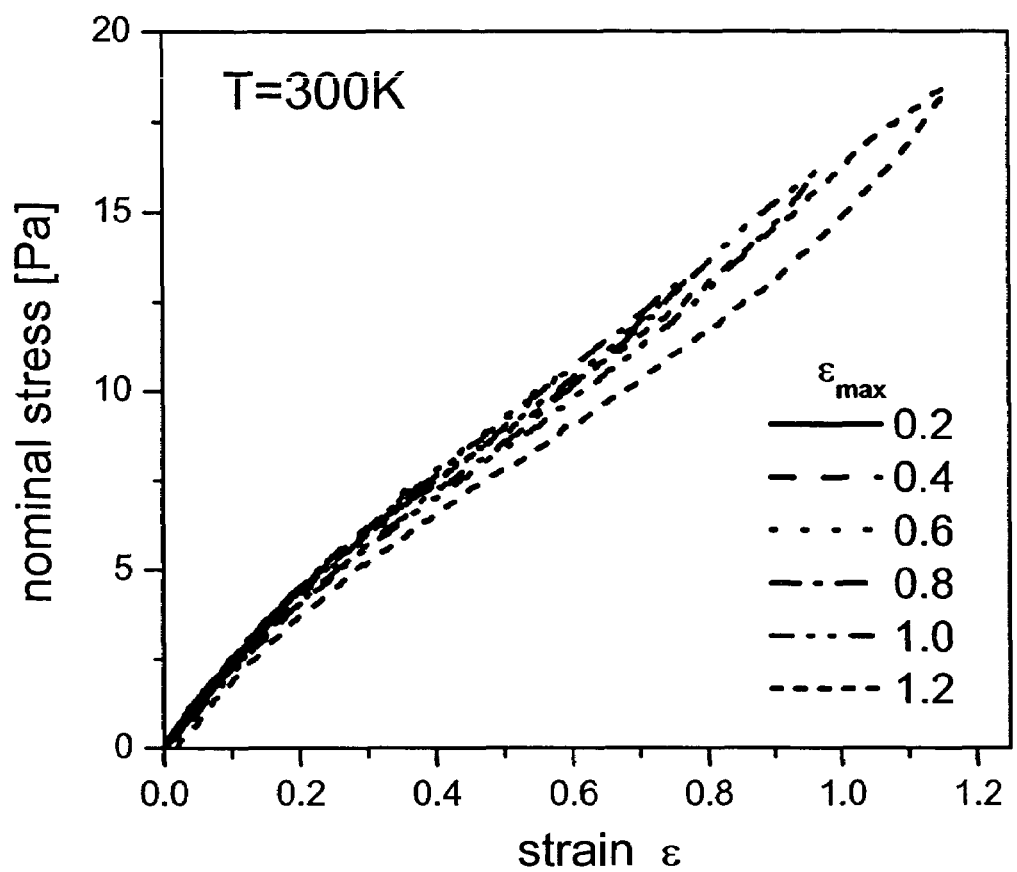
FIG. 6 shows the stress-strain cycles with successively increasing maximum strain ($\epsilon_{max}$) for the lightly cross linked hairy network of poly(n-butyl-acrylate) measured at room temperature; the results indicate good reversibility of rather large tensile deformation.

An example of the measurement of the physical properties a material of the present invention is shown in FIG. 5. FIG. 5 illustrates the mechanical properties obtained from a cross-linked bottle-brush macromolecule (one specific case of a FIG. 3A system). This specific hairy macromolecule, with $N_b$=3500, and $N_{sc}$=30, was obtained by a "grafting from" polymerization process using a linear macroinitiator and a transition metal complex as polymerization reaction mediator. ($N_b$ is the degree of polymerization of the backbone and $N_{sc}$ is the degree of polymerization of the side chains.) The "hairy" macromolecule was isolated and cross-linked by continuing the atom transfer reactions on the reactive chain ends in bulk to instigate some side chain-side chain coupling reactions thereby forming a polymer network. FIG. 5 shows that the soft rubbery plateau has a shear modulus of about $1.5 \; 10^3$ Pa and extends over a broad range of temperatures and over a broad range of deformation rates.

"Grafting from" a macroinitiator has been disclosed in U.S. Pat. No. 5,807,937 and WO 98/40415 in the following papers: Beers, K L, A Kern and Matyjaszewski (1997). "Graft/comb copolymers by atom transfer radical polymerization: hydrogels." Polym Prepr (Am Chem Soc, Div Polym Chem) 38(1): 695–696; Beers, K L, S G Gaynor, K Matyjaszewski, S S Sheiko and M Moeller (1998); "The Synthesis of Densely Grafted Copolymers by Atom Transfer Radical Polymerization." Macromolecules 31(26): 9413–9415.

Embodiments of the method of the present invention also include "grafting through" of macromonomers to form polymerization of "hairy" macromolecules as disclosed in U.S. application Ser. No. 10/034,908, which is also herein incorporated by reference. Grafting through polymerizations allow preparation of polymers wherein the "hairs" can be prepared by any controlled polymerization process and may additionally include preparation of organic/inorganic hybrid systems, such as, but not limited to, polydimethylsiloxane "hairs" formed by anionic or Ring opening polymerization processes into a radical polymerization process. Indeed with the range of polymerization processes available to one skilled in the art there are a multiplicity of approaches to prepare the hairy macromolecules. Macromolecules may be tailored with any desired Tg or desired "phylicity" of the attached side chains and hereby comprise useful tactile or other properties.

In the examples, the preparation of super-soft elastomeric materials is described comprising polymerization of oleophylic macromonomers. Such as, octadcecyl methacrylate and hydrophylic macromonomers containing ethylene oxide (EO) segments with different degrees of polymerization ($DP_{PEO}$=5 and 23), capped by a methoxy- and a methacrylate group, (PEOMA). The method is exemplified by atom transfer radical polymerization (ATRP) in organic solvents and direct preparation of densely grafted brush polymers by "grafting through" the macromonomers. PEOMA ($MW_{av}$=300 g/mol, $DP_{PEO}$=5) was used in a "grafting from" reaction using a well-defined multifunctional macroinitiator poly(2-(2-bromopropionyloxy)ethyl methacrylate (PBPEM, $M_{n,ap.}$=82×10$^3$ g/mol, $M_w/M_n$=1.16, $DP_b$=428). This method resulted in the preparation of densely double-grafted brush copolymers with various degrees of polymerization of the side chains ($DP_{sc}$=12–43). Attempts to prepare double-grafted brushes with $DP_{sc}$>43 or the use of a macromonomer with a longer PEO chain ($MW_{av}$=1100 g/mol, $DP_{PEO}$=23) in the "grafting from" reaction resulted in the direct formation of a cross-linked gel with elastomeric properties.

Materials comprising a polymer network with mono-grafted and double-grafted side chains are embodiments of the present invention comprising a Young's modulus of ~10$^4$ Pa. Octadcecyl methacrylate is a suitable monomer for such double grafting reactions. Examples of macromonomers forming graft copolymers included, but are not limited to, including (polystyrene-MM/N-vinyl pyrrolidinone, poly(m-ethyl methacrylate)-MM or polyethylene-MM with n-butyl acrylate, polydimethylsiloxane-MM and polylactide-MM with methyl methacrylate). Such macromonomers may be homopolymerized or copolymerized to form graft, brush or comb polymers suitable for conversion to super-soft elastomers.

Macromonomers with hydrophilic poly(ethylene oxide) (PEO) segments have been used to prepared biocompatible materials which find application in aqueous based systems.

Embodiments of the method also include cross-linking "hairy" nanoparticles: preparation of "hairy" nanoparticles is described in U.S. application Ser. No. 09/972,046, or WO 02/28912 which is also herein incorporated by reference. The nanoparticles may be cross-linked by chemical reaction with added cross-link agents, by other chemistry that may induce tethered chain-tethered chain coupling, as described above for the linear polymer, or by physical cross-linking.

Embodiments of the present invention include polymer networks with attached side chains. The side chains may be of any length. However, in some embodiments it may be advantageous for the molecular weight of the side chains to be lower than $M_e$. The length of the side chains effects the softness of the final network and extension of side chain to a length where they entangle with other side chains should extend the frequency range of the modulus plateau, FIG. 5, up to the level typical for polymer rubber elasticity i.e. at $10^5-10^6$ Pa (the final modulus depending on the chemical nature of the monomer). For example, the polymers prepared in example 6b by cross-linking of double-grafted copolymers with much more constrained first-grafted chains by thermal processes, (FIG. 9) or chemical processes, (FIG. 10), the modulus is $\sim 10^4$ Pa. However, extension of the molecular weight of the backbone between cross links or a reduction in the cross-linking of the backbone or preparation of a polymer network with network unentangled or constrained, side chains, may lead to an extension of the frequency range of the super soft elastomeric plateau with the modulus level well below $10^4$ Pa.

Materials of the present invention may find application in products, such as tissues, fibers for fabrics, such as, but not limited to, a polyester fiber that feels softer than silk, a bullet-proof vest that will be pleasant to wear. Other uses would be toys, furniture applications, carpet underlayment, and things you hold, such as, handles for tools. Because of the extreme softness the materials will find application in impact modifiers including sound insulation and protective equipment. The bulk tactile response can be modified by selecting the composition of the "dangling chains or hairs" and can vary from hydrophilic to hydrophobic and encompass attached oleophilic and oleophobic diluents that respond to environmental pressures and can be further modified, as discussed above, by changing the degree of cross-linking of the backbone matrix to form a material with the desired modulus for the targeted application. Higher levels of cross-linking, or increased stiffness of either the backbone or tethered dangling graft or "hair" will increase the modulus while still providing polymers significantly softer than current elastomers.

The components of the super-soft material can be selected so that the material acts as sponge for selected soluble low molecular species thereby providing super-super-soft elastomers. Such a solvent swollen upper soft elastomer may have a modulus two orders of magnitude lass than the super soft bulk material.

Further since the side chains may comprise block copolymers, wherein the composition of the blocks differ, the materials can also function as a sponge to selectively absorb, or as a source for selective desorption of any low molecular weight molecules which had been selectively adsorbed into the dispersed segments and protected by the shell network. Such a functional soft shell elastomeric network can be further chemically crosslinked to preserve the elastomeric properties while the phase separated domains function as reservoirs allowing materials to be added to or withdrawn from the domains. The softness, stability and phylicity of the material can be selected to allow implantability.

Definitions:

A "hairy" macromolecule is a homopolymer or copolymer comprising a linear, branched or star polymeric backbone with at least one segment comprising a multiplicity of side chains.

Thermoplastic Elastomers have been defined in "A Comprehensive Review of Thermoplastic Elastomers" Edited by Legge, N. R.; Holded, G.; and Schroeder H. E. Hanser Publication 1987 systems and are hereby specifically incorporated by reference.

Hairy colloids, or hairy nanoparticles, are materials comprising a core material, either an organic core or an inorganic core, and a multiplicity of attached side chains. The preparation of hair nanoparticles has been described in U.S. application Ser. No. 09/972,046, or WO 02/28912 systems and are hereby specifically incorporated by reference.

Nanoparticle is a particle with diameter in the range 1–100 nm.

The composition of the side chains may be selected to provide different rigidity for the side chains and that the side chains can comprise functionality to assist in the formation of the final super-soft elastomeric network.

Additionally, the composition of the side chains may be selected to provide different phylicity for the super-soft elastomer ranging from oleophylic to oleophbic.

Embodiments of the method include a process directly forming the super-soft elastomer in one continuous reaction.

While these examples do provide examples of one approach (using controlled radical polymerization) to the new materials they do not provide the only approach and other synthetic tools known in the art will also provide materials with the defined structure and these approaches are hereby included in this disclosure.

EXAMPLES

Materials. Poly(ethylene glycol) methyl ether methacrylate, $H_2C=C(CH_3)COO-(CH_2CH_2O)_nCH_3$, (PEOMA, $MW_{av}$=300 g/mol, $DP_{PEO}$=5; $MW_{av}$=1100 g/mol, $DP_{PEO}$=23) were obtained from Aldrich. Antioxidants MEHQ and BHT were removed from monomers by passing through an alumina column. PEOMA with higher MW, which is solid at room temperature (rt), was dissolved in tetrahydrofuran (THF); after removing of the inhibitor, the solvent was evaporated and the macromonomer was dried under vacuum to a constant weight. Copper(I) bromide (CuBr, Aldrich, 98%) and copper(I) chloride (CuCl, Acros, 95%) were purified by stirring with glacial acetic acid, (Fisher Scientific), followed by filtration and washing the solid three times with ethanol, and twice with diethyl ether. The solid was dried under vacuum ($1\times 10^{31\ 2}$ mbar) for 2 days. Copper(II) bromide ($CuBr_2$, Acros, 99+%) and copper (II) chloride ($CuCl_2$, Aldrich, 99.99%) were used as received. p-Toluenesulfonyl chloride (TosCI, Aldrich, 99+%) and 2,2'-azobis(izobutyronitrile) (AIBN, Aldrich, 98%) were recrystallized in hexane and ethanol respectively, then filtered, and dried.

4,4'-Di(5-nonyl)-2,2'-bipyridyne (dNbpy), tris(2-ethylhexylacrylate aminoethyl) amine ($EHA_6TREN$) and cumyl dithiobenzoate (CDB) were prepared as described in cited references. N,N,N',N'',N'''-Pentamethyldiethylenetriamine (PMDETA, Aldrich, 99%), ethyl 2-bromoisobutyrate (EtBriBu, Aldrich, 99%), all solvents and internal standards were used without further purification.

Characterization.

Gel Permeation Chromatography (GPC) measurements in THF were conducted using a Waters 515 liquid chromatograph pump (1 mL/min, 30° C.) equipped with four columns (guard, $10^5$ Å, $10^4$, $10^3$ Å; Polymer Standards Service) in series and with three detection systems: a differential refractometer (Waters Model 410), multi-angle laser light-scattering (MALLS) detector (DAWN Model F), a differential viscometer (Viscotek Model H502) with toluene as an internal standard. The molecular weights of the copolymers were determined based on low polydispersity linear poly (methyl methacrylate) (PMMA) standards. The refractive index increment dn/dc was determined with an Otsuka Photal RM-102 differential refractometer.

Elemental Analysis (EA) of C, H, O, and Br contents in brush polymers was performed by Midwest Microlab (Indianapolis, Ind.). The degree of polymerization of the side chains based on elemental analysis ($DP_{sc(EA)}$) was calculated in following way:

$$DP_{sc(EA)} = \frac{M_{RU(EA)} - M_{BPEM}}{M_{PEOMA}}; \quad M_{RU(EA)} = \frac{M_{Br} \times 100\%}{\% Br_{(EA)}}$$

where: $M_{RU(EA)}$—molecular weight of one repeat unit of backbone calculated from EA; $M_{BPEM}$=265 g/mol; $M_{PEOMA}$=300 g/mol; $M_{Br}$=80 g/mol; % $Br_{(EA)}$—value of bromine content in brush polymer determined by elemental analysis.

X-ray Diffraction (WAXS) and the Small Angle X-ray Scattering (SAXS) were used to characterize the structure in bulk materials. In both cases X-ray sources with the CuKα radiation (λ=0.154 nm), with a pinhole collimation and 2D position sensitive detectors (Bruker) were used. Measurements were performed at various temperatures.

Dynamic Mechanical Measurements were performed using a mechanical spectrometer, RMS 800 (Rheometic Scientific). Frequency dependencies of the complex shear modulus at a reference temperature (master curves) were determined from frequency sweeps measured with a small amplitude sinusoidal deformation at various temperatures under a dry nitrogen atmosphere. Independently, temperature dependencies at a constant deformation rate were measured.

DSC (Metler 30) was used to determine the glass transition temperatures. Heating and cooling runs were performed with the rate of 10° C./min.

Atomic Force Micrographs were recorded with a Nanoscope IIIa instrument (Digital Instruments) operating in the tapping mode. The measurements were performed at ambient conditions (in air, 56% relative humidity, 27° C.) using Si cantilevers with a spring constant of ca. 50 N/m, a tip radius of 8 nm, and a resonance frequency of about 300 kHz. The set-point amplitude ratio was varied in a broad range from 0.4 to 0.9 to attain clear resolution of the side chains. While the side chains were resolved at lower ratios, height profiles of adsorbed molecules were measured at higher values of the amplitude ratio to minimize tip indentation. The samples for tapping mode SFM measurements were prepared by spin-casting dilute solutions of brush molecules in chloroform at 2000 rpm.

1. Formation of Linear Brush Macromolecules and Cross-Linking of pBPEM-Graft-pnBuA ($BPEM_{(3750)}$-g-$nBA_{(30)}$) to Prepare a Super-Soft Elastomer.

1a. Synthesis of Ultrahigh Molecular Weight (UHMW) Poly(2-trimethyl silyloxy) Ethyl Methacrylate (pHEMA-TMS): Backbone Polymer by RAFT for Transformation Into High Molecular Weight Macroinitiator In order to achieve a very high degree of polymerization of pHEMA-TMS, a RAFT system was used as the CRP technique (target $BPEM_{(3750)}$).

Reagents:

| HEMA-TMS: | 10 g; | 49.4 mmol (30% conv. 14.8 mmol; $DP_{target}$ = 3600) |
|---|---|---|
| AIBN: | 0.0002 g | 0.00124 mmol (stock sol. 0.0026 g/10 mL toluene) |
| Raft Agent | 0.0011 g | 0.0041 mmol (stock sol. 0.0105 g/9 mL toluene) |

Reaction temperature 60° C. Reaction time 58 h

HEMA-TMS (10 g; 49.4 mmol), and azobisisobutyronitrile (AIBN) (0.0002 g; 0.0012 mmol; of AIBN in a stock solution in toluene (0.0026 g AIBN/10 ml toluene) were added to a 25 mL Schlenk flask followed by the addition of the RAFT agent (0.0011 g; 0.0041 mmol; of RAFT agent in a stock solution in toluene (0.0105 gi 9 ml toluene). The reaction mixture was degassed by three freeze-pump-thaw cycles and after stirring for 0.5 h at room temperature an initial sample was taken and the flask was placed in a thermostated oil bath at 60±1° C. The polymerization was stopped after 58 h. by cooling the reaction mixture to room temperature. A final sample was taken to determine relative monomer conversion against toluene as internal standard by GC. Samples were taken and conversion was determined both by GC (relative monomer consumption) and GPC (relative monomer consumption). The calculated theoretical $M_n$ were calculated based on average monomer consumption $(([M]_0-[M])/[RAFT])$. The conversion of monomer to polymer was followed and the semi logarithmic plot showed an induction period of about 18 h. If we do not take into account that the HEMA-TMS monomer was distilled twice before use, such an induction phase is typical for the presence of inhibitor. However after the induction period the plot follows a straight line. GPC shows a regular increase in molecular weight with conversion although when $M_{n,app}$ (THF; RI; pMMA) is compared to the theoretical molecular weight values there is some discrepancy. The difference in $R_h$ of pMMA standards and pHEMA-TMS explains the discrepancy in molecular weight that increases with increasing MW. From monomer conversion assuming constant number of RAFT agent, the final theoretical DP is 3300. During the polymerization reaction the PDI decreases constantly and it finally reached 1.30.

1b. Transformation of pHEMA-TMS to p(2-Bromopropionic Acid) Ethoxy Methacrylate (pBPEM).

The reaction was conducted following the general procedure described earlier in cited applications, however in order to avoid cross-linking reactions the amount of solvent was doubled, and solutions of 0.5 mmol tetrabutylammonium fluoride in 5 mL THF and 74.6 mmol 2-bromopropionyl bromide in 15 mL THF were added over 7 min. and 40 minutes respectively. Complete transformation of pHEMA-TMS was confirmed by $^1$H-NMR. GPC analysis (THF, viscosity detector): $M_n$=990.000; PDI=1.30 (DP=3750). GPC trace of the final pHEMA-TMS was compared to the final polymer after transesterification, pBPEM. The esterification of the precursor polymer results in an increase in apparent molecular weight from $M_n$=480000 (pHEMA-TMS)→$M_n$=610000 (pBPEM)) while the PDI remains constant (about 1.30). Molecular weight determined using online viscosity detection and universal calibration was found to be $M_n$=990,000 (PDI=1.30; DP=3750) corresponds well with the $M_{n,th}$(GC).

1c. Grafting n-Butyl acrylate (nBuA) from pBPEM (BPEM$_{(3750)}$): to Prepare pBPEM-Graft-pnBuA (BPEM$_{(3750)}$-g-nBA$_{(30)}$).

Reaction conditions: [M]$_0$:[In]$_0$:[CuBr]$_0$:[CuBr$_2$]$_0$:[dNbpy]$_0$:[MEK]$_0$=700:1:0.5:0.025:1:11 vol. %, 70° C.; 24 h; $M^{n\,app}$=2.76×10$^6$ and $M_w/M_n$=1.31 (GPC); $M_n$=and $M_w/M_n$= (GPC-MALLS); DP$_{sc;grav.}$=30).

The frequency dependencies of the real and imaginary parts of the complex modulus obtained from a melt of this polymer are shown in FIG. 4.

The contour length, L, of pBA brushes separated by chromatography was determined from AFM and the results are given in Table 2. The contour lengths were measured from AFM micrographs obtained from spin-casting the same brushes on mica. For each sample, more than 200 individual molecules were randomly taken for statistical analysis. The measured contour length of the original sample (which was spin cast before fractionation), shows that there was little or no axial shrinkage of the pnBA brushes when compared with L expected from either the conversion or more accurate GPC measurements. For samples fractionated on a GPC column, there was a clear correlation between the contour length of the molecules and the order in which they were removed from the column. This indicated that further separation of the molecules on size exclusion columns was able to discriminate between the contour lengths of the molecules even for such narrow molecular weight macroinitiators.

TABLE 2

Contour length, L, of pBA brushes determined from AFM.

| PnBA brush | $L_w$ | $L_n$ | $L_w/L_n$ | # of samples |
|---|---|---|---|---|
| original | 134 | 113 | 1.18 | 427 |
| fraction 1 | 140 | 126 | 1.11 | 349 |
| fraction 2 | 118 | 109 | 1.08 | 249 |
| fraction 3 | 90 | 79 | 1.14 | 339 |
| sum of fractions | 121 | 104 | 1.15 | 937 |

In a typical example of the images obtained from AFM the molecules were observed as worm-like particles (species) lying flat on the substrate. Because of the strong interaction of the side chains with the substrate and the soft amorphous nature of pnBA at room temperature, the cross-section which was observed was a flat (2 nm) and wide (25 nm) molecule, (Qin, S.; Borner, H. G.; Matyjaszewski, K.; Sheiko, S. S. *Polymer Preprints (American Chemical Society, Division of Polymer Chemistry)* 2002, 43, 237–238.). Lighter regions in the micrograph indicate higher elevations that correspond to crossing molecules due to their random sequential adsorption onto the substrate. Scratching the brushes from the surface with the tip (contact mode) revealed that the dark space between the lighter cylinders was mica. The frequency dependencies of the real and imaginary parts of the complex modulus obtained from this polymer are shown in FIG. 4 where three regions can be distinguished which correspond to various material states: (1) glassy, (2) hard gel and (3) soft gel.

1d. Crosslinking of pBPEM-Graft-pnBuA (BPEM$_{(3750)}$-g-nBA$_{(30)}$) to Prepare a Super-Soft Elastomer:

Since the graft segments of the pBPEM-graft-pnBuA (BPEM$_{(3750)}$-g-nBA$_{(30)}$) were prepared by ATRP each graft chain end retains a radically transferable atom that can be reactivated if desired. This was done in this case for the bulk polymer system and radical-radical termination reactions were allowed to occur. The result is that there was some inter-molecule linking, through the graft segments, and a network was formed. FIG. 5 shows that the soft-gel inflection seen in the linear copolymer FIG. 4 has been stabilized and that the modulus curves for such a graft-graft cross-linked copolymer, i.e. lightly cross-linked bottle-brush molecules, display an extended elastic modulus around 10$^3$ Pa.

2. Additional Example of Formation of Brush Macromolecules for Chemical Cross-Linking.

2a. Grafting nBuA from High MW pBPEM: to Prepare pBPEM-Graft-pnBuA.

As in example 1, a pBPEM macro-initiator, with DP 3900, was prepared by transesterification of a precursor pHEMA-TMS, with an apparent $M_n$ of 5.4×10$^5$. The apparent molecular weight of this macroinitiator is 5.43×10$^5$ and PDI=1.46. This macroinitiator was used for grafting from polymerization of n-butyl acrylate using the conditions detailed below and the results are shown in Table 3.

Reaction conditions for run 2a.

| n-BA [M] | pBPEM [Ini] | [Cu$^+$] | [Cu$^{2+}$] | [dNbpy] | Solvent Toluene |
|---|---|---|---|---|---|
| 600 | 1 | 0.5 | 5% of Cu$^+$ | 1 | 12% of M |
| 43.7 g | 0.14 g | 36.72 mg | 0.4481 g in stock | 209.29 mg | ~5.0 ml |

TABLE 3

Results for run 2a:

| Entries | Time (h) | Mn | PDI |
|---|---|---|---|
| macroinitiator | 0 | 5.43 × 10$^5$ | 1.46 |
| 2a sample 1 | 4 | 1.17 × 10$^6$ | 1.53 |
| 2a sample 2 | 8 | 1.50 × 10$^6$ | 1.46 |
| 2a sample 3 | 21.5 | 2.04 × 10$^6$ | 1.42 |
| 2a sample 4 | 30.5 | 2.66 × 10$^6$ | 1.29 |

From the polymerization results shown in Table 3, it can be seen that the polymerization process for the preparation of this linear brush copolymer has the characteristics of a living radical polymerization, the Mn of resulting brush increased with increasing reaction time, and PDI decreased gradually. A linear polymer with an apparent MW of 2.66 million was obtained. AMF images of molecules from this sample show the individual molecules appear as extended "thick or "fat" molecules on the surface.

It should be emphasized that when the polymerization is stopped, the reaction system is homogenous and all the polymer brushes are soluble. However, after removing the catalyst and precipitating the polymer by adding the solution into methanol, the resulting polymer looks like a gel. This gel is initially difficult to re-dissolve in THF, but after stirring for two days at room temperature the solution again becomes to homogenous, and this dilute solution can pass through the 0.2 um filter. This first formed gel is the result of physical chain entanglement of the very long "hairy" polymer brush. Such a molecule is exemplary of the molecule shown in FIG. 1A in that the bulk of the monomer units are in the form of dangling chains well below the Me. However unlike the cross-linking scheme shown in FIG. 1A where an added cross-linking agent is added this molecule has inherent chain end functionality that can undergo crosslinking by exposure to a suitable catalyst or stimulus.

This gel phase can be converted into a permanent structure exhibiting super-soft properties by chemical cross-linking which can conveniently be induced in an ATRP system by conducting the polymer precipitation in the presence of some catalyst allowing chain-chain coupling to occur. (See FIG. 3a and FIG. 5)

3. ATRP of n-octadecyl acrylate and n-octadecyl methacrylate (a Linear "Hairy" Macromolecule Prepared by "Grafting Through").

n-Octadecyl acrylate and n-octadecyl methacrylate are ideal commercially available model hydrophobic monomers that can provide interesting block, statistical and gradient copolymer grafts when copolymerized with polar monomers or polar monomer precursors. In order to define the conditions for such copolymerization the model reactions are described. Both n-octadecyl acrylate and n-octadecyl methacrylate possess one further interesting property that can be exploited in bottle brush copolymers. Homopolymers of these monomers have displayed the ability to crystallize into paraffin like crystallites similar to those observed with polyethylene even though the backbone is not stereoregular, thereby providing a physically cross-linked network. These monomers can also be considered to be macromonomers since the octadecyl-substituent of the (meth)acrylate monomer can be considered to be a linear hydrocarbon side chain with a molecular weight well below $M_e$.

3a. Polymerization of n-octadecyl acrylate.

The experimental conditions used for this reaction were based on the ones used for ATRP of n-dodecyl acrylate.[ Beers, K. L.; Matyjaszewski, K. *J. Macromol. Sci., Pure Appl. Chem.* 2001, A38, 731–739.] A slightly higher amount of deactivator was added at the beginning of the reaction, (5 mol % relative to the amount of catalyst), as the rate constant of termination ($k_t$) of n-octadecyl acrylate (nOA) might be even lower than the one of n-dodecyl acrylate due to the additional bulkiness of the monomer unit.

Concentration ratios: [Monomer]:[Initiator]:[Catalyst]:[Ligand]=100:1:1:2
$Cu^{II}/Cu^{I}$=0.05
Monomer/Solvent=1/1 vol.

After 30 hours of polymerization at 90° C., nOA conversion was 56% ($^1$H NMR) and $M_n$=13,470 g/mol (GPC). The mixture remained dark red and homogeneous throughout the process. GPC traces for different kinetic points showed a clean shift in molecular weight with conversion with no detectable tailing. Polydispersity remained fairly narrow throughout the process, with a final polydispersity index of 1.17. A semi-logarithmic plot for this polymerization provided the expected straight line, indicating a constant number of active species throughout the polymerization as expected in the case of a controlled/"living" polymerization system.

3b. Polymerization of n-octadecyl methacrylate.

Experimental conditions used for ATRP of n-octadecyl methacrylate (nOMA) were close to the conditions used in the previous reaction, (example 3a), with n-octadecyl acrylate (nOA). However, the difference in the behavior of methacrylates versus acrylates and other monomers, as described elsewhere in referenced work must be considered. Thus, "*halide exchange*" [Matyjaszewski, K.; Shipp, D. A.; Wang, J.-L.; Grimaud, T.; Patten, T. E. *Macromolecules* 1998, 31, 6836–6840] was used. Therefore $Cu^I$Br was replaced by $Cu^I$Cl in the formation of the catalyst complex for this reaction. As in the case of n-octadecyl acrylate, example 3a, a small amount of deactivator is added at the beginning of the reaction, (5 mol % relative to the amount of catalyst), to improve the degree of control over the polymerization.

Concentration ratios: [Monomer]:[Initiator]:[Catalyst]:[Ligand]=100:1:1:2
$Cu^{II}/Cu^{I}$=0.05
Monomer/Solvent=1/1 vol.

After 6 hours of polymerization at 90° C., nOMA conversion was 87% ($^1$H NMR) and $M_n$=26400 g/mol (GPC). As in example 3a the mixture remained dark red and homogeneous throughout the polymerization process. GPC traces displayed a clean shift of the molecular weight of the polymer toward the high molecular weights as the reaction progressed. Polydispersity remained around 1.14 throughout the process with a perfect symmetry in the shape of the GPC curves. This seems to indicate that polymerization proceeded in a controlled fashion, with a more than acceptable global rate of polymerization. The semi-logarithmic plot for this polymerization, shows the expected straight line.

Whereas nOA and nOMA are molecules that can directly provide a "hairy" macromolecule these monomers are just one examples of one type of substitutent that can be present on (meth)acrylate based macromonomer used for grafting from a macroinititiator to form a brush block copolymer or graft copolymer. The particular advantage of this series of monomers comprising alkyl-chains as the substituent is that the bulk of the grafted chain increases as the length of the chain increases and thereby the rigidity of the side chain increases, increasing the modulus of super-soft elastomer, as does the oleophylicity of the molecule, i.e. by selecting the substituent(s) comprising the side chain the bulk chemical properties and bulk physical properties can be modified.

The hydrocarbon chain length in nOA and nOMA reduce the modulus of the crosslinked polymer (MW~250). nOA and nOMA polymers may comprise segments of more complex molecular archtectures. (See example 7).

4. Formation of Star Brush Macromolecules for Chemical "Cross-Linking".

The following examples are provided to demonstrate that polymers of differing initial topology can readily be prepared and as indicated in FIG. 2 would be suitable for linking to form "hairy" networks displaying super-soft elastomeric properties either by cross-linking through the terminal groups on the backbone molecule or through functional groups on the "hairs" as described above.

4a. Synthesis of Three-Armed Macroinitiator pBPEM

In order to avoid the possibility of either intra- or inter-cross-linking of the propagating radicals during the reaction, the polymerization of HEMA-TMS using a trifunctional initiator was carried out at low temperature (75° C.), using CuCl/(dNbpy)$_2$ as catalyst, and diluting the reaction medium by adding 40% volume of anisole as solvent. The detailed molar ratio of the reactants employed in the reaction is listed below. The results of the analysis of samples taken to follow the reaction kinetic are given in Table 4.

Reaction conditions for run 4a

| HEMA-TMS [M] | 3BriBu [Ini] | CuCl [$Cu^+$] | dNbpy [ligand] | Anisole solvent |
|---|---|---|---|---|
| 1800 | 1 | 2.25 | 4.4 | 40 (v/v) |
| 10 g | 10.34 mg | 3.05 mg | 25.3 mg | 4.0 ml |

The polymerization was carried out at 75° C.

During the polymerization, molecular weight of the resultant three arm pHEMA-TMS increased with reaction time, which was easily observed from the GPC traces, the relationships of $\ln([M]_0/[M])$ and conversion with time, and by the observed regular increase of $M_n$ with monomer conversion. However, the molecular weight of the resulting pHEMA-TMS doesn't match well with the theoretical values, calculated from monomer conversion, it is systemically lower than the theoretical value. The reason for this behavior has been attributed in many papers to the fact that the $M_n$ value analyzed using refractive index detection calibration vs. linear PMMA standards does not yield accurate data for a star polymer. The DP of each arm of the final pHEMA-TMS ($M_{n,\ GPC}$=82700, PDI=1.16) is 140, while the theoretical value is 310 calculated by conversion. The final sample of pHEMS-TMS was converted to pBPEM successfully without any cross-linking reactions occurring during the hydrolysis and esterification as described above for the linear sample.

TABLE 4 kinetic results for 4a:

| Entries     | Time (h) | Conv. (%) | Mn    | PDI  |
|-------------|----------|-----------|-------|------|
| 4a sample 1 | 1.0      | 6.57      | 29600 | 1.21 |
| 4a sample 2 | 2.0      | 12.37     | 39400 | 1.18 |
| 4a sample 3 | 3.0      | 16.72     | 45000 | 1.17 |
| 4a sample 4 | 4.0      | 20.23     | 53500 | 1.16 |
| 4a sample 5 | 5.0      | 24.65     | 59200 | 1.14 |
| 4a sample 6 | 6.5      | 31.13     | 65700 | 1.15 |
| 4a sample 7 | 8.5      | 38.31     | 71000 | 1.16 |
| 4a sample 8 | 12.5     | 51.21     | 82700 | 1.16 |

4b Synthesis of Corresponding Brush Macromolecule

The macroinitiator, 4a sample 8, was used to prepare a three arm brush macromolecule using nBA as side chain monomer employing the following reaction conditions.

Conditions for Reaction 4b:

| nBA [M] | Sample 4a [Ini] | CuBr(dNbpy)$_2$ [Catalyst] | CuBr$_2$ [Deactiviator] | Anisole Solvent |
|---------|-----------------|----------------------------|-------------------------|-----------------|
| 600     | 1               | 0.5                        | 5%                      | 25%             |

The polymerization was carried out at 70° C. and after 42 h reaction the monomer conversion reached 6.2% and Mn of the final brush is $4.76 \times 10^5$. The DP of each side chain is 30 determined by weight conversion of nBA monomer.

4c. Copolymerization of nBA and DMAEMA

The purpose of this example is to exemplify the preparation of a three-arm star brush copolymer in which the dangling side chain will comprise a nBA/DMAEMA copolymer, i.e. a star copolymer containing in-chain functionality suitable for subsequent reactive and/or chemically reversible crosslinking to form an extended network and containing further functionality that can be employed to attach a second reactive molecule to the network.

This type of copolymerization in which one or more comonomers comprise an additional reactive functionality can also be used for functional brush copolymer synthesis with a linear pBPEM macroinitiator or in the preparation of functional "hairy" nanoparticles.

The reaction conditions are given below for run 4c and the results are summarized in table 5.

Conditions for Reaction 4c:

| nBA/DMAEMA [M] | MBP [Ini] | PMDETA [ligand] | CuBr [catalyst] | Anisole Solvent |
|----------------|-----------|-----------------|-----------------|-----------------|
| 400 (90/10)    | 1         | 1               | 1               |                 |
| (11.5/1.6) g   | 27.9 ul   | 20.1 ul         | 18 mg           | 2.5 ml          |

TABLE 5

Results for reaction 4c

| Entries     | Time (h) | Conv. (%) (nBA/DMAEMA) | Mn                 | PDI  |
|-------------|----------|------------------------|--------------------|------|
| 4c sample 1 | 1.0      | 8.6/21.1               | $6.26 \times 10^3$ | 1.39 |
| 4c sample 2 | 2.0      | 11.7/28.9              | $7.08 \times 10^3$ | 1.43 |
| 4c sample 3 | 3.0      | 15.4/36.7              | $8.83 \times 10^3$ | 1.37 |
| 4c sample 4 | 4.0      | 20.2/46.7              | $1.08 \times 10^4$ | 1.35 |
| 4c sample 5 | 6.5      | 27.6/62.2              | $1.42 \times 10^4$ | 1.28 |
| 4c sample 6 | 10       | 37.7/75.5              | $1.76 \times 10^4$ | 1.25 |
| 4c sample 7 | 20.5     | 52.5/89.1              | $2.31 \times 10^4$ | 1.23 |
| 4c sample 8 | 33.5     | 60.4/93.6              | $2.61 \times 10^4$ | 1.22 |
| 4c sample 9 | 46       | 65/x                   | $2.83 \times 10^4$ | 1.22 |

An examination of the GPC traces of the samples taken at different time during the run show clean chain extension to higher molecular weight, however when the relationship of $\ln([M]_0/[M])$ and time are examined for both monomers it is seen that the kinetics of rate of consumption of both monomer are not the first order, while the molecular weight of the resulting copolymer increases with increasing of the total monomer conversion. The results show that these two monomers can be copolymerized using ATRP technique, but the polymerization rate of DMAEMA is faster than that of nBA (about twice as fast). The resulting copolymer is a gradient copolymer with a higher concentration of DMAEMA closer to the backbone of the first macroinitiator.

While the polymerization is controlled the MWD is rather high when monomer conversion is less than 20%, which is the maximum conversion in brush synthesis, in order to remove the possibility of unwanted coupling reactions. Therefore for the preparation of uniform bottle brush copolymers the polymerization should be further optimized, such as adding CuBr$_2$ into the reaction system. However for the preparation of super-soft materials the only requirement for the attached graft chains is that the majority of them are dangling free and have a MW below $M_e$. This sample meets that criteria.

5. Synthesis of Four Arm Star Shape pBPEM Macroinitiator and Corresponding Brushes 5a. Synthesis of Four Arm pHEMA-TMS and Four Arm pBPEM Macroinitiator The reaction conditions used for the polymerization of HEMA-TMS from a tetrafunctional initiator are given below:

Conditions for Reaction 5a:

| HEA-TMS [M] | 4BriBu [Ini] | CuBr [Catalyst] | CuBr$_2$ [deactivator] | dNbpy [Ligand] | Anisole Solvent |
|-------------|--------------|-----------------|------------------------|----------------|-----------------|
| 2400        | 1            | 3               |                        | 6              | 40%             |
| 10 g        | 15 mg        | 8.86 mg         | 0.7 mg                 | 50.39 mg       | 4 mL            |

The polymerization was carried out at 70° C., and after 6.0 hours the reaction was stopped. At that time the monomer conversion was 55.8% as determined by GC, with $M_n=1.42\times10^5$ and $M_w/M_n=1.22$. The DP of each arm for this four arm pHEMA-TMS is 340 calculated by monomer conversion. The obtained four arm pHEMA-TMS was transesterified to provide a four arm pBPEM which was used as macroinitiator backbone for the synthesis of a four arm star brush copolymer in run 5b.

5b. Direct Synthesis of a Four Arm Star Brush Copolymer Super-Soft Elastomer

Conditions for Reaction 5b:

| n-BA [M] | 5a [Ini] | CuBr [Catalyst] | CuBr$_2$ [deactivator] | dNbpy [Ligand] | Anisole Solvent |
|---|---|---|---|---|---|
| 600 | 1 | 0.5 | 5% | 1 | 25% |
| 30 g | 150 mg | 28.2 mg | 2.18 mg | 162.4 mg | 8.5 mL |

The polymerization was carried out at 70° C. and after 2.5 hours conversion was 5.5% resulting in preparation of a four arm brush copolymer with Mn $7.77\times10^5$ and PDI 1.25. The DP of side chain is 23 determined by monomer conversion. The GPC profiles of the macroinitiator and the brushes show clean chain extension although the shape of the GPC curve from the final polymer was non-Gausian, it seems that the final brush was chemically-crosslinked by chain-chain radical coupling during the purification, for it cannot dissolve in any solvent to allow AFM analysis.

An in situ gel system was formed by arm-arm coupling, i.e. direct formation of a super-soft elastomer.

5c. Synthesis of a Soluble Four Arm Star Brush Copolymer

In order to examine the precursor soluble "hairy" star copolymer a new batch of four arm-star brushes was prepared and the final stage: formation of the star bottle-brush copolymer, was conducted using CuCl as the sole transition metal catalyst, i.e. without added copper (II). An examination of the AFM the resulting soluble four arm brush polymers. (Images in Matyjaszewski, K.; Qin, S.; Boyce, J. R.; Shirvanyants, D.; Sheiko, S. S. *Macromolecules* 2003, 36, 1843–1849 show that most of the brushes have the four-arm structure.)

Conditions for Reaction 5c:

| HEMA-TMS [M] | 4BriBu [Ini] | CuCl [Catalyst] | dNbpy [Ligand] | Anisole Solvent |
|---|---|---|---|---|
| 2400 | 1 | 3 | 6 | 40% |

The polymerization was carried out at 75° C. and the results for reaction 5c1 are given below:

| Entries | Time (h) | Conv. (%) | Mn | PDI |
|---|---|---|---|---|
| 5c1 sample 1 | 2.0 | 4.2 | 26800 | 1.18 |
| 5c1 sample 2 | 4.0 | 7.9 | 43100 | 1.14 |
| 5c1 sample 3 | 6.0 | 12.3 | 52300 | 1.13 |
| 5c1 sample 4 | 9.0 | 17.6 | 60000 | 1.13 |
| 5c1 sample 5 | 11.5 | 22.6 | 65600 | 1.13 |
| 5c1 sample 6 | 20.5 | 35.5 | 75000 | 1.15 |

-continued

| Entries | Time (h) | Conv. (%) | Mn | PDI |
|---|---|---|---|---|
| 5c1 sample 7 | 25.0 | 41.7 | 80000 | 1.17 |
| 5c1 sample 8 | 32.0 | 50.1 | 103500 | 1.16 |

After purification, the resulting four arm star pBPEM was transesterification with 2-bromopropionyl bromide to form a four arm star pBPEM macroinitiator (run 5c2). According to the conversion value obtained by GC, the DP of each arm is 300, this pBPEM then used as backbone for the star brush synthesis (5c3).

Conditions for Reaction 5c3:

| n-BA [M] | 5c2 [Ini] | CuBr [Catalyst] | CuBr$_2$ [deactivator] | dNbpy [Ligand] | Anisole Solvent |
|---|---|---|---|---|---|
| 500 | 1 | 0.5 | 0.025 | 1 | 25% |

The polymerization was carried out at 70° C.

Results for Reaction 5c3:

| Entries | Time (h) | Conv. (%) | Mn | PDI |
|---|---|---|---|---|
| Sample 5c2 (I) | 0 | 0 | 110800 | 1.18 |
| Sample 5c3 (Brush) | 46.5 | 7.9 | 80500 | 1.37 |

After the 46.5 h the polymerization was stopped. The conversion of nBA was 7.9% as determined by GC, DP of side chain was 37. The GPC traces of the backbone before and after functionalization as well as the final four arm star brush, all show clean increases in the MW of polymer at each step and the final brush molecular weight increases evidently from the backbone pBPEM.

6. Preparation of a Brush Copolymer by Polymerization of PEOMA by "Grafting Through".

6a. Direct Formation of a Poly(PEOMA) Macromonomer with High DP

PEO macromonomer, ligand (with the exception of EHA$_6$TREN, which was added after degassing), solvent, CuBr$_2$ (if used in the reaction) and CuBr were added to a Schlenk flask and degassed by three freeze-pump-thaw cycles. After stirring the mixture at room temperature for 1 hour the initiator, EtBriBu, was added to start the reaction. The polymerization was stopped by opening the flask and exposing the catalyst to air. The reaction mixture was then diluted with methylene chloride and passed through a column filled with neutral alumina to remove the copper complex. The remaining unreacted PEOMA macromonomer was removed by ultrafiltration in MeOH/THF (50/50 vol. %) solution mixture, and the pure brush polymer was dried under vacuum to a constant weight.

In the case of the RAFT experiment, PEOMA (2.02 g, 1.84 mmol), CDB (0.002 g, 0.0074 mmol) and anisole (1.5 ml) were combined in the Schlenk flask, degassed and then the initiator, AIBN (0.00024 g, 0.0015 mmol) dissolved in 0.5 ml anisole (after bubbling by nitrogen for 10 min. at O° C.), was added.

Armes and Haddleton [*Macromolecules* 2001, 34, 162–164] have described the preparation of polyPEOmacromonomers but the polymers had a low degree of polymerization, i.e. the resulting polymers had a relatively short backbone and therefore a low number of grafts ($DP_b$=10–40, $DP_{PEO}$=7–8, PDI=1.15). By conducting the polymerization as detailed herein it is possible to conduct a "grafting through" reaction with a lower molecular weight PEOMA macromonomer ($MW_{av}$=300 g/mol, $DP_{PEO}$=5) and prepare high molecular weight polymacromonomers with good control. The use of EtBriBu/CuBr/dNbpy, initiator/catalyst system, resulted in a polymerization that reached high conversion, around 90%, within 2 h but molecular weight distribution of resulting polymer was broad (PDI=1.46) and after 4 h it cross-linked forming an in situ gel. However, the addition of $CuBr_2$, as a preformed deactivator, to the initial reaction mixture decreased the reaction rate, yielding a PPEOMA, with $DP_b$~300 after 4.5 h and low polydispersity ($DP_n$=1.18). GPC curves showed that the entire distribution moves smoothly towards higher MW values with conversion. Only at higher conversion, (>50%), is some tailing visible, which may be due to either termination or transfer reactions. Changing both the initiator and solvent (EtBriBu to TosCl and toluene to tetrahydrofuran (THF)) results in an increase in polydispersity of the polymer finally leading to direct gelation of the reaction mixture.

Use of a PEOMA macromonomer with a higher molecular weight ($MW_{av}$=1100 g/mol, $DP_{PEO}$=23) for "grafting through" enables the preparation of a brush polymer with 23 units of EO in each side chain. Lower conversion of macromonomer to polymacromonomer (in the range 17–50%) leads to well-defined polymers ($DP_n$<125) with low polydispersity (PDI~1.15). The addition of $CuBr_2$, or dilution of the reaction mixture, slows down the reaction, leading to better control. Replacement of THF by toluene or anisole, while using the same reaction conditions, also results in a slower well controlled polymerization. When another ligand, $EHA_6TREN$, scheme 1, was used, along with a lower polymerization temperature (T=60° C.), the rate of reaction was slower and the reaction was better controlled leading to a polymer with a moderately low polydispersity (PDI=1.47) and a high degree of polymerization ($DP_n$=204). Monomodal GPC traces were obtained for the polymerization of this high molecular weight PEO macromonomer.

Scheme 1.

a)

b)

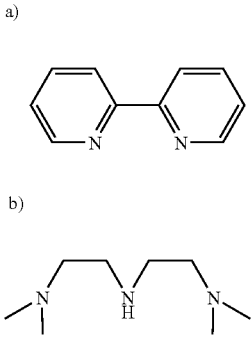

-continued c)

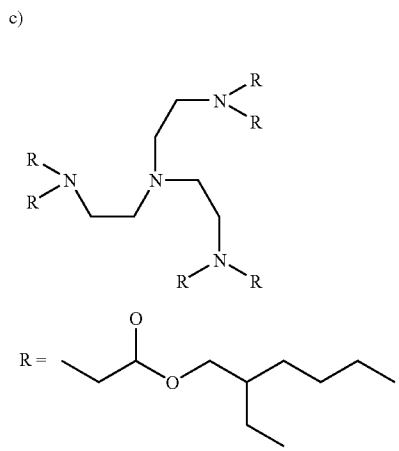

Structure of Ligands: a) dNbpy, b) PMDETA and c) $EHA_6TREN$

The viscoelastic spectrum of one such polymer (sample IIIE in table 6) is presented in FIG. 8, both the both the segmental relaxation and the PEO side chains relaxation can be well distinguished but global flow does not take place, at least at temperatures below 400 K. An extension of the measured frequency dependencies of G' and G" to lower frequencies would require heating the sample to temperatures above 400 K. However at higher temperatures the material is no longer thermomechanically simple, because of additional cross-linking, (samples heated to these temperatures became insoluble). In this sample instead of the expected global flow range only a plateau in G' extending towards low frequencies (well below $10^3$) is observed. This plateau indicates elastomeric properties for such polymers. The plateau modulus in this case is much lower than that seen for typical polymeric rubbers, which has to be attributed to the large fraction of the short dangling chains, or "hairs" in the system. Such chains provide significant mobility making the material extremely soft.

6b Preparation of a Double-Grafted Copolymer

6b1 HEMA-TMS ($DP_n$=400) was prepared in a similar manner to example 1a employing the following ratio of reagents: TosCl (0.0095 g, 0.05 mmol), 1 ml HEMA-TMS and anisole (0.54 ml, 10 vol %), dNbpy (0.0306 g, 0.075 mmol) and the rest of monomer (4.4 ml) were combined in a 25 ml Schlenk flask and degassed by three freeze-pump-thaw cycles then CuBr (0.0054 g, 0.0375 mmol) was added. After stirring the mixture for 10 min to form the catalyst complex, the Schlenk flask was placed in a thermostated oil bath set at 90° C. After 3 min the initiating system was transferred into the Schlenk flask and an initial sample was taken. During polymerization, samples were periodically removed to determine molecular weight of the polymer by GPC and analyze conversion by GC. The reaction mixture was stirred for a total of 5.5 h, before being cooled to ambient temperature, exposed to air, diluted with $CH_2Cl_2$ and filtered through a neutral alumina column to remove the copper catalyst. Finally, the solvent was removed and the polymer was dried under vacuum to a constant weight.

6a2 Transformation of P(HEMA-TMS) to PBPEM:

P(HEMA-TMS) ($M_{n,app.}=81\times10^3$ g/mol; $M_w/M_n=1.19$) (10 g; assumed 50 mmol) was dissolved in 125 ml dry THF under nitrogen. Potassium fluoride (2.9 g; 50 mmol) was added followed by slow addition of 0.5 ml tetrabutylammonium fluoride (1 M in THF; 0.5 mmol) and then dropwise addition of 7.8 ml 2-bromopropionyl bromide (75 mmol) over the course of 15 minutes. The reaction mixture was stirred at room temperature for 4 h, exposed to air, precipitated into methanol/ice (50/50 v/v), dissolved in 200 ml $CHCl_3$ and filtered through activated alumina column (basic). The polymer was reprecipitated three times in hexanes and dried in vacuum oven at 25° C. for 24 h.

6b3 Polymer Synthesis: P(BPEM-graft-PEOMA).

PEOMA ($MW_{av}=300$ g/mol; 152 mmol, 21.6 g), PBPEM (0.1 g; 0.38 mmol initiator groups), dNbpy (0.1 g, 0.38 mmol), $CuBr_2$ (0.0021 g, 0.0095 mmol) and toluene (6.5 ml, 30 vol. %) were added to a 50 mL Schlenk flask and the mixture degassed by three freeze-pump-thaw cycles. After stirring at room temperature for 1 h, CuBr (0.027 g, 0.19 mmol) was added and an initial sample was taken before the flask was placed in a thermostated oil bath set at 70° C. In one reaction the $CuBr_2$ and CuBr were replaced by $CuCl_2$ (0.0064 g, 0.0475 mmol) and CuCl (0.019 g, 0.19 mmol). The polymerization was stopped by cooling to room temperature and opening the flask to air. GPC was used to analyze the molecular weight and the polydispersity. The reaction mixture was diluted in chloroform and passed through a column of alumina (neutral) to remove the copper catalyst. The unreacted macromonomer PEOMA was removed by ultrafiltration in MeOH/THF (50/50 vol. %) solution mixture, and the polymer was dried under vacuum to a constant weight.

Brush polymers with a range of degree of polymerization, $DP_{sc}=19-43$, after on times. (Table 6)

backbone between the cross-links (c.f. FIG. 5 which shows a lower modulus for a less densely crosslinked molecule).

Both the "grafted through" and the "grafted from" double-grafted polymers prepared from the macromonomer with the short PEO ($MW_{av}=300$; $DP_{PEO}=5$) segment were amorphous, whereas, the polymers from the higher molecular weight macromonomer ($MW_{av}=1100$; $DP_{PEO}=23$) were crystalline. The temperature dependencies of the real (G') and imaginary (G") parts of the shear modulus show that the main softening/hardening transition in the sample with short PEO chains is related to the temperature of transition to the glassy state (at about 220 K). Crystallization causes an abrupt jump in properties that takes place at about 280 K because of considerable undercooling. The modulus of the crystallized sample is lower than that of a similar polymer in the glassy state because at temperatures close to crystallization the amorphous fraction of the material still remains soft.

In the case of the amorphous double-grafted brushes, we were able to record the mechanical behavior indicating both non cross-linked and the cross-linked structures. An example of the frequency dependencies of the real and imaginary moduli for the non cross-linked polymer, IIIE, is shown in FIG. 9a. In this system the characteristic relaxation processes, segmental, side chain and global relaxation (marked by the vertical dashed lines) can be distinguished. The high frequency relaxation is the segmental motion corresponding to the glass transition of the system. The low frequency relaxation corresponds to the polymer motion controlling macroscopic flow. The relaxation corresponding to the side chain motion is seen with a plateau of the order of $10^4$ Pa. It suggests that there is a PEO chain relaxation somewhere between the segmental and the PPEOMA side chain relaxation process and that this contributes to the drop

TABLE 6

Results of Polymerization of PEOMA ($MW_{av}$ = 300 g/mol) by "Grafting From" PBPEM

| no. | time (h) | conv [%] (GPC) | $M_{n,th.}\times 10^{-3}$ | $M_{n,ap.}\times 10^{-3}$ (GPC) | $M_w/M_n$ (GPC) | $DP_{sc,}$ (GPC) | $DP_{sc,}$ (grav.) | $DP_{sc}$ (EA) |
|---|---|---|---|---|---|---|---|---|
| MIA | 0 | — | 113 | 82 | 1.16 | 428* | — | — |
| IIIA[a)] | 5 | 3.1 | 1553 | 431 | 1.21 | 12 | — | — |
| IIIB | 10 | | | cross-linking | | | | |
| IIIC | 2 | 4.9 | 2393 | 700 | 1.28 | 19 | — | — |
| IIID | 2.5 | 6.2 | 3000 | 904 | 1.66 | 25 | 25 | 23 |
| IIIE | 3 | 7.5 | 3713 | 1492 | 1.70 | 30 | 36 | 31 |
| IIIF | 6 | 9.7 | 4793 | 1671 | 1.75 | 39 | 43 | 38 |
| IIIG | 7 | | | cross-linking | | | | |
| MIB | 0 | — | 88 | 64 | 1.32 | 334* | — | — |
| | 1 | 0.6 | 288 | 119 | 1.17 | 2 | — | — |
| | 2 | 1.0 | 489 | 180 | 1.15 | 4 | — | — |
| | 5 | 3.3 | 1391 | 482 | 1.31 | 13 | — | — |
| | 7 | 4.9 | 2092 | 638 | 1.43 | 20 | — | — |
| IIIH | 8 | 6.5 | 2693 | 804 | 1.55 | 26 | 29 | — |

Cond.: PEOMA:PBPEM:CuBr:dNbpy:$CuBr_2$ = 400:1:0.5:1:0.025;
toluene 30 vol. %;
T = 70° C.;
[a)]CuCl;
$CuCl_2$ 0.125;
*$DP_b$ Continuation of the polymerization or directly cross-linking the isolated soluble polymer forms a cross-linked system with the viscoelastic properties shown in FIGS. 8 and 9. An elastic modulus with G' of $10^4$ Pa is seen. This shows that the modulus is partially dependent of the length of the of the modulus below the conventional polymeric rubbery plateau level. The flow range is not clearly visible because of possible cross-linking taking place in the samples when the modulus is being measured at higher temperatures. This cross-linking taking place at higher temperatures may be indicated in greater detail by observing the effect of annealing on the viscoelastic spectra, as illustrated in FIGS. 9b and 9c for the samples annealed in the air atmosphere at temperatures 100° C. and 120° C., respectively. In the annealed samples the segmental relaxation becomes slower and a low frequency plateau develops with the height increasing with increasing temperature for the annealing; i.e. with increasing cross-link density. These samples obtained by thermally induced cross-linking behave as soft elastomers.

Figure 10:
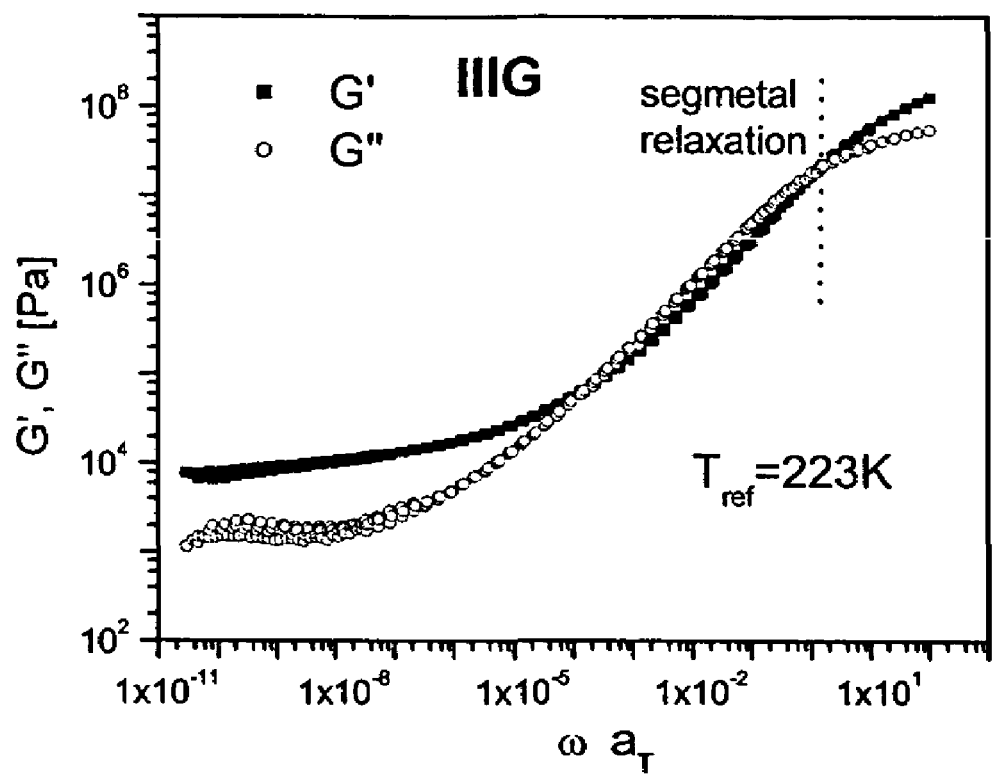
FIG. 10 is a graph of the frequency dependencies of the real (G') and imaginary (G") shear modulus components for a polymers obtained by "grafting from" method using the macromolecular initiator and the PEOMA ($MW_{av}$=300 g/mol) as macromonomer, wherein the sample is cross-linked at high conversion stages of the polymerization (IIIG).

A cross-linking reaction has also been observed in samples where the polymerization was taken to higher conversions (IIIG). An example of such a case is shown in FIG. 10. A comparison of the thermally cross-linked double-grafted brush network IIIE (FIG. 9c) with the system cross-linked during polymerization, IIIG, (FIG. 10) shows that the plateau modulus in both cases are similar. Modulus level at the order of $10^4$ Pa indicates that the PEO chains swell and plasticize both systems. However the plasticizer is attached to the polymer network in the form of short chains. The mobility of the short non cross-linked PEO chains makes these systems very soft in comparison to conventional networks.

7. Formation of Block-Brush Macromolecules Displaying "Physical Cross-Linking" (i.e. Phase Separation in a Block Copolymer).

7a. Synthesis of High Functional End Group ptBMA (7a1), and Preparation and Characterization of ptBMA-b-pOMA(7a2).

The synthesis of ptBMA macroinitiator with high end group functionality was conducted using the ratio of reagents given below and shows the detailed conditions for ptBMA macroinitiator synthesis, in order to get high end-group functionalization the polymerization was carried out at low temperature (60° C.) and stopped when the polymerization was at 57.9% conversion.

Conditions for Reaction 7a1:

| tBMA [M] | EBiB [Initiator] | CuBr(dNbipy)$_2$ [Cat/L] | CuBr$_2$ [Deactivator] | Solvent o-Xylene |
|---|---|---|---|---|
| 100 5.687 g | 1 58.7 ul | 1 57.4/327 mg | 5% of CuBr 4.5 mg | 50% (v/v) 6.5 mg |

In this case a stock solution CuBr$_2$ was used to allow accurate measurement and T=60° C.

Results for Reaction 7a1:

| No. | Time (Min) | Conv. (%) | Mn | PDI |
|---|---|---|---|---|
| sample 1 | 40 | 28.1 | 4.93 × 10$^3$ | 1.16 |
| sample 2 | 80 | 42.1 | 7.79 × 10$^3$ | 1.18 |
| sample 3 | 120 | 57.9 | 9.25 × 10$^3$ | 1.19 |

This macroinitiator was used for the preparation a ptBMA-b-pOMA (OMA is octadecyl methacrylate, a monomer that can form a polymer segment that can undergo both phase separation and phase crystallization) block copolymer using conditions are summarized below. The results are given in Table 7.

Reaction Condition for Experiment 7a2:

| OMA [M] | ptBMA [Initiator] | CuBr(dNbipy)$_2$ [Cat/L] | CuBr$_2$ [Deactivator] | Solvent o-Xylene |
|---|---|---|---|---|
| 100 1.693 g | 1 0.4475 g | 1 8.2/81.8 mg | 5% of CuBr 0.6 mg | 4 ml |

In this case, CuBr$_2$ was added as a stock solution and T = 85° C.

TABLE 7

Results for polymerization reaction 7a2:

| No. | Time (h) | Conv. (%) | Mn | PDI |
|---|---|---|---|---|
| 7a1 sample 3 | 0 | 0 | 9.25 × 10$^3$ | 1.19 |
| 7a2 sample 1 | 5.5 | 30.5 | 2.25 × 10$^4$ | 1.19 |
| 7a2 sample 2 | 16.5 | 86.3 | 5.20 × 10$^4$ | 1.20 |

The results of the chain extension are summarized in Table 7 and clearly show an increase in the molecular weight as the polymerization progressed, and that the resulting block copolymer has rather low polydispersity (1.20). The GPC trace showed clean chain extension which indicates that the ptBMA macroinitiator is highly functionalized since there is no residue peak left in the original ptBMA macroinitiator position. The final ptBMA-b-pOMA copolymer was characterized by $^1$HNMR, AFM and DSC. According the NMR spectrum the composition of the two segments is ptBMA/pOMA=1:1.37 in molar ratio. The AFM imagines of ptBMA-b-pOMA copolymer before and after annealing were also examined. The samples were prepared by spin coating on silicon surface; the concentration is 10 mg/ml in chloroform. An examination of the images obtained from height images and phase images before annealing and after annealing show that evidence of phase separation in the initial sample is not as clear as that of after annealing a day at 160° C. This might be due to the fact that complete phase separation is not easy at room temperature which could be caused by the high viscosity of long ester chain in pOMA segments, however, the final sample forms a well separated, physically cross-linked system. In both case, no crystallization phase was found due to the fact that the melting point is lower than the temperature at which the AFM was performed. The DSC trace of ptBMA-b-pOMA copolymer; the analysis was carried out with the heating rate 30° C./min (from −50~200° C.) and show the melting point of pOMA segment is 25.93° C., and the crystallization temperature is 13.67° C.

7b. Synthesis of High Functional End Group ptBA Macroinitiator and Preparation and Characterization of ptBA-b-pOMA Block Copolymer.

The above example was repeated using t-butyl acrylate. The ptBA macroinitiator was synthesized using ATRP by conditions and the polymerization proceeded in living fashion. The molecular weight of the resulting ptBA appeared to be little larger than the theoretical values, which is due to the dynamic volume of ptBA being larger than that of the PMMA standards used for in GPC calibration. A well-defined ptBA with M$_n$=8300 and PDI=1.14 was obtained in the first step and was used to initiate OMA polymerization to obtain the ptBA-b-pOMA copolymer. The resulting block copolymer has an M$_n$ of 28700 and a rather low polydispersity (1.13). An examination of the AFM imagines of ptBA-b-pOMA copolymer prepared by spin coating a solution of the block copolymer, the concentration is 10 mg/ml in chloroform onto a clean silicon surface; showed phase separation while no crystallization phase was found due to the melting point being lower than room temperature at which the AFM was performed.

7c. Synthesis of ABA Triblock Copolymer Containing pOMA Segments

7c1. Synthesis of Difunctional pnBA Macroinitiator

The polymerizations were carried out at 70° C. using DMDBH as initiator and PMDETA/CuBr complex as catalyst. A difunctional pnBA macroinitiator, 7c1, with Mn=$3.50 \times 10^4$ and PDI of 1.17 was synthesized using the conditions listed below.

Condition for Reaction 7c1:

| nBA [M] | DMDBH [Ini] | CuBr [Cu⁺] | PMDETA [ligand] | anisole Solvent |
|---|---|---|---|---|
| 500 | 1 | 1 | 1 | ~20% |

Initiator 7c1 was used to synthesize pOMA-b-pnBA-b-pOMA triblock copolymer, sample 7c using the following conditions.

Conditions for Reaction 7c2:

| OMA [M] | pnBA [Ini] | CuCl(dNbpy)$_2$ [Cu⁺] | CuCl$_2$ [ligand] | o-xylene Solvent |
|---|---|---|---|---|
| 300 3.75 g | 1 1.27 g | 1 7.2/60 mg | ~0.5% 0.5 mg | 8 ml |

The polymerization was carried out at 90° C. and GPC traces of the macroinitiator and the triblock copolymers show clean chain extension and a final pOMA-b-pnBA-b-pOMA triblock copolymer with Mn=$7.44 \times 10^4$ and PDI=1.16. The $^1$H NMR spectrum of 7c shows that the composition of the two segments is pnBA/pOMA=1:0.82 in molar ratio. AFM characterization was conducted and phase separation was clearly observed in both height and phase images.

7d. Synthesis of pOMA-b-ptBA-b-pOMA Triblock Copolymer

The preparation of a difunctional ptBA macroinitiator was carried out at 65° C. using DMDBH as initiator and PMDETA/CuBr complex as catalyst, anisole as internal standard and acetone as solvent. After 44 h at 65° C. the monomer conversion reached 32%, and a difunctional macroinitiator ptBA with Mn=$3.86 \times 10^4$ and PDI=1.12 was obtained. This macroinitiator was used for the synthesis of a pOMA-b-ptBA-b-pOMA block copolymer.

The conditions used for the synthesis of pOMA-b-ptBA-b-pOMA triblock copolymer are shown below:

Reaction Conditions for Reaction 7d:

| OMA [M] | ptBA [Ini] | CuCl(dNbpy)$_2$ [Catalyst] | CuCl$_2$ [Deactivator] | o-xylene Solvent |
|---|---|---|---|---|
| 200 6.5 g | 1 1.747 g | 2 9.3/76.9 mg | 0.1 0.63 mg | 16 ml |

The polymerization was carried out at 90° C. and resulted in the preparation of a block copolymer with Mn of 75900 and PDI of 1.14 for the final tri-block copolymer. GPC traces show clean chain extension from the difunctional macroinitiator and the AFM images of the triblock copolymer on silicon surface show phase separation.

8. Formation of Block-Brush Macromolecules Displaying Physical "Crosslinking" (Phase Separation and Crystallization). pOMA-b-pHEMA-TMS to pOMA-b-pBPEM and Finally pOMA-b-(pBPEM-g-pnBA)

8a1. Preparation of First Macroinitiator

A block brush with pOMA block segment is interesting for the potential crystallization behavior of the pOMA block therefore a pOMA-b-pHEMA-TMS was synthesized with pOMA as the first macroinitiator. The conditions used for pOMA macroinitiator synthesis are listed below:

Reaction conditions for reaction 8a1:

| OMA [M] | EBiB [Ini] | CuCl(dNbpy)$_2$ [Catalyst] | CuCl$_2$ [deactiviator] | o-Xylene Solvent |
|---|---|---|---|---|
| 200 6.77 g | 1 29.3 ul | 1 19.8/163.5 mg | 5% 1.3 mg | 8 ml |

The polymerization was carried out at 90° C. and the final polymer obtained after 8 hours, and at 92% conversion, had Mn of 34700 and a PDI of 1.12.

8a2. Chain Extension of Macroinitiator

The pOMA-b-pHEMA-TMS copolymer was synthesized by chain extension from pOMA macroinitiator, prepared in run 8a1, using the following conditions:

Conditions for Chain Extension Reaction; 8a2:

| HEMA-TMS [M] | pOMA [Ini] | CuCl(dNbpy)$_2$ [Catalyst] | CuCl$_2$ [deactiviator] | o-Xylene Solvent |
|---|---|---|---|---|
| 400 1.62 g | 1 0.7075 g | 1 1.98/16.4 mg | 5% 0.13 mg | 50 ~2 ml |

The polymerization was carried out at 85° C. and resulted in the formation of a block copolymer with Mn 74200 and a PDI of 1.23 after 94 hours and at a conversion of 73.1%. The Mn of the block copolymer increased throughout the reaction however, from the GPC traces it was seen that there were trace amounts of pOMA left in reaction system. This indicates that there was the dead macroinitiator bearing no Br at the chain end present. This portion of the polymer was removed after ester transformation of pOMA-b-pHEMA-TMS to pOMA-b-pBPEM, (run 8a3), the later was precipitated in hexane while the former remained dissolved in it.

8a4 The pOMA-b-pHEMA-TMS polymer was transesterified to pOMA-b-pBPEM, and the pOMA-b-(pBPEM-g-pnBA) brush was prepared using the conditions listed below:

Conditions for Reaction 8a4:

| nBA [M] | SQ82 [Ini] | CuBr(dNbpy)$_2$ [Catalyst] | CuBr$_2$ [Deactiviator] | Anisole Solvent |
|---|---|---|---|---|
| 500 | 1 | 0.5 | 5% | 25% |

The polymerization was carried out at 70° C. After 33 h, the nBA conversion reached 6.8%, and DP of side chain is 35 as determined by the increase in weight. Kinetic curves shows an increase of Mn of the block-brush copolymers with the increasing reaction time and GPC curves show no tailing indicating high functionality for the macroinitiator.

8b. Preparation of pOMA-b-pBPEM-b-pOMA and Corresponding Brushes

The block-brush copolymers with an pOMA block segment are interesting materials to study the crystallization behavior of pOMA. AMF observation of pOMA-b-(pBPEM-g-pnBA) brushes show images in which it is seen that the pOMA segments can aggregate together when spread on the mica surface, thus the two single molecular of this brush can connect with each other by the pOMA segments. In other words the polymer undergoes phase separation and phase aggregation. It can be imagined that if a dilute solution of pOMA-b-(pBPEM-g-pnBA)-b-pOMA triblock brush is synthesized, they may form long chain extended chain images or more probably loop structures on mica surface by the connection of the end pOMA segments one by one however in this application it is the bulk properties that are of interest and these are dependent on the confirmed phase separation capabilities of the block copolymer comprising hairy segments.

Therefore, a difunctional pHEMA-TMS macroinitiator was synthesized and used to initiate polymerization of OMA to form a pOMA-b-pHEMA-TMS-b-pOMA triblock copolymer. Then the block copolymer was transesterified to provide a pOMA-b-pBPEM-b-pOMA macroinitiator, which was used to initiate nBA polymerization for the preparation of an ABA block brush copolymer.

8b1. Preparation of a pOMA-b-(pBPEM-g-pnBA)-b-pOMA Block Copolymer

The difuctional HEMA macroinitiator was prepared using the following conditions:

| HEMA-TMS [M] | DMDBH [Ini] | CuBr(dNbpy)$_2$ [Catalyst] | CuBr$_2$ [deactiviator] | anisole Solvent |
|---|---|---|---|---|
| 300 5 g | 1 17.9 ul | 2 23.6/134.4 mg | 5% 1.84 mg | 20 ~2 ml |

The polymerization was carried out at 85° C. and resulted in the preparation of a polymer with Mn 52400 and a PDI of 1.3 after 3.5 hours and at a conversion of 78% as determined by GC. This difunctional macroinitiator was chain extended to prepare pOMA-b-pHEMA-TMS-b-pOMA triblock copolymer using the following conditions:

| OMA [M] | DiBrpHEMA [Ini] | CuBr(dNbpy)$_2$ [Catalyst] | CuBr$_2$ [Deactiviator] | o-xylene Solvent |
|---|---|---|---|---|
| 600 14 g | 1 3.6 g | 2 20/114 mg | 5% 1.6 mg | 11 mL |

The polymerization was carried out at 90° C. and after 7.0 h, OMA conversion reaches 76% and the Mn of the block copolymer increased to 1.39×10$^5$ (PDI=1.33). The pOMA-b-pHEMA-TMS-b-pOMA was transformed to pOMA-b-pBPEM-b-pOMA by transesterification as described above.

The desired pOMA-b-(pBPEM-g-pnBA)-b-pOMA triblock copolymer was prepared using condition listed below:

| nBA [M] | 7b1 [Ini] | CuBr(dNbpy)$_2$ [Catalyst] | CuBr$_2$ [Deactiviator] | Anisole Solvent |
|---|---|---|---|---|
| 600 21.7 g | 1 0.245/0.075 g | 0.5 20.37/115.8 mg | 5% 1.66 mg | 50% 12 mL |

Again the polymerization was carried out at 70° C. and the results obtained from analysis of samples taken throughout the course of the reaction are shown below:

| Entries | Time (h) | Mn | PDI |
|---|---|---|---|
| Initiator | 0 | 1.39 × 10$^5$ | 1.30 |
| Sample 1 (Bru) | 9 h | 2.42 × 10$^5$ | 1.31 |
| Sample 2 (Bru) | 20 h | 3.36 × 10$^5$ | 1.33 |
| Sample 3 | 33 h | 4.35 × 10$^5$ | 1.32 |
| Sample 4 | 46 h | 4.94 × 10$^5$ | 1.31 |
| Sample 5 | 62 h | 5.57 × 10$^5$ | 1.32 |

Examination of the GPC traces of samples 1–5 show clean movement of the curves to higher molecular weights with extended reaction time.

9. Physical Evaluation.

The DSC/SAXS/DMA properties of the "hairy" AB and ABA block copolymers prepared in examples 8a1 and 8b1; [pOMA-b-(pBPEM-g-pnBA) and pOMA-b-(pBPEM-g-pnBA)-b-pOMA block copolymers] were studied and displayed similar mechanical behavior to that shown in FIGS. 5 and 6 for a physically cross-linked linear "hairy" macromolecule, see FIG. 7. I.e. super-soft elastomers were formed wherein the network was formed by physical cross-links resulting from phase separation o a segmented block copolymer. The behavior of these samples is particularly interesting since is shows that thermoplastic super soft elastomers can be prepared.

When one block of such a copolymer is soluble in a substrate then an attached super-soft coating would be formed.

Another approach to such a super soft coating would be to conduct a 'grafting through' polymerization of a suitable macromonomer from an attached initiator, i.e direct 'grafting from' the surface comprising attached initiators. Other processes known in the art such as forming an attached multifunctional initiator for a second 'grating from' reaction would also work. The only requirement is to form a coating wherein the polymer directly attached to the surface has a high fragment of dangling chains attached to them. While not inherently elastomeric, since it is difficult to stretch a coating, such coatings will have the tactile response of a surface enveloped in a super-soft elastomer.

The examples described herein to exemplify the concept that polymer networks with attached "hairy" chains, or dangling polymer segments where the chain length is less than $M_e$, form materials with novel properties further indicate that a broad variation of properties is possible by changes of the following molecular parameters: side chain length, side chain composition, grafting density, backbone length and also the cross linking methodology and crosslink density. These parameters influence the extent and levels of the elastic plateau in the complex viscoelastic spectrum and consequently modification of these parameters should allow generation of materials with extremely different properties ranging between the hard glassy to super soft elastic, taken as examples.

We claim:

1. An elastomeric material, comprising:
   a polymer network having a multiplicity of side chains and a rubbery plateau in a modulus of elasticity of less than $10^5$ Pa.

2. The elastomeric material of claim 1, wherein the polymer has a rubbery plateau in a modulus of elasticity of less than $5 \times 10^4$ Pa.

3. The elastomeric material of claim 2, wherein the polymer has a rubbery plateau in the modulus of elasticity of less than $10^4$ Pa.

4. The elastomeric material of claim 1, wherein at least a portion of the side chains have a glass transition temperature less than 6° C.

5. The elastomeric material of claim 1, wherein at least a portion of the side chains have a glass transition temperature less than −20° C.

6. The elastomeric material of claim 1, wherein a backbone of the polymer network is cross-linked.

7. The elastomeric material of claim 1, wherein a substantial portion of the side chains have a molecular weight below the critical molecular weight for entanglement.

8. The elastomeric material of claim 1, wherein the % elongation of the material is greater than 10%.

9. The elastomeric material of claim 6, wherein the polymer network comprises chemical cross-links.

10. The elastomeric material of claim 6, wherein the polymer network comprises physical cross-links.

11. The elastomeric material of claim 3, wherein the polymer network is lightly cross-linked.

12. The elastomeric material of claim 3, wherein the polymer network is highly cross-linked.

13. The elastomeric material of claim 1, wherein the side chains swell the polymer network.

14. The elastomeric material of claim 13, wherein the side chains comprise greater than 50% of the monomer units in the polymer network.

15. The elastomeric material of claim 14, wherein the side chains comprise greater than 75% of the monomer units in the polymer network.

16. The elastomeric material of claim 15, wherein the side chains comprise greater than 95% of the monomer units in the polymer network.

17. A material comprising:
    a polymeric network, and
    a multiplicity of side chains attached to the polymeric network, wherein the multiplicity of side chains have an average molecular weight below the critical molecular weight for entanglements and are sufficient to swell the polymer network.

18. The material of claim 17, further comprising a multiplicity of branches attached to the side chains.

19. The material of claim 17, wherein at least a portion of the side chains comprise a glass transition temperature less than 0° C.

20. The material of claims 17, wherein at least a portion of the side chains comprise a glass transition temperature less than −20° C.

21. The material of claim 17, wherein the polymer network comprises inorganic components.

22. The material of claim 17, wherein at least one of the polymer network backbone and side chains comprises a copolymer.

23. The material of claim 18, wherein the branches comprise a copolymer.

24. The elastomeric material of claim 1, wherein the polymer network has a modulus of elasticity between $10^2$ Pa and $10^5$ Pa.

25. The elastomeric material of claim 1, wherein the polymer network has a modulus of elasticity between $10^2$ Pa and $10^4$ Pa.

* * * * *

UNITED STATES PATENT AND TRADEMARK OFFICE
CERTIFICATE OF CORRECTION

PATENT NO. : 7,019,082 B2
APPLICATION NO. : 10/638584
DATED : March 28, 2006
INVENTOR(S) : Krzysztof Matyjaszewski and Tadeusz Pakula It is certified that error appears in the above-identified patent and that said Letters Patent is hereby corrected as shown below:

Column 3, line 14, delete "macomolecules" and insert --macromolecules--

Column 3, line 31, delete "them" and insert --than--

Column 4, line 34, delete "$N_{rc}=30$" and insert --$N_{sc}=30$--

Column 6, line 27, delete "omoners" and insert --monomers--

Column 10, line 29, delete "hereby" and insert --thereby--

Column 12, line 54, delete "$(1 \times 10^{31\ 2}\ mbar)$" and insert --$(1 \times 10^{-2} mbar)$--

Column 25, line 34, delete "after on times" and insert --after different reaction times--

Column 28, line 31, delete "imagines" and insert --images--

Column 28, line 58, delete "be little" and insert --be a little--

Column 28, line 65, delete "imagines" and insert --images--

Column 31, line 13, delete "molecular" and insert --molecules--

Column 31, line 67, delete "using condition" and insert --using conditions--

Column 32, line 37, delete "separation o a" and insert --separation of a--

Signed and Sealed this

Tenth Day of February, 2009

JOHN DOLL
*Acting Director of the United States Patent and Trademark Office*